United States Patent
Krasnoshchok et al.

(10) Patent No.: US 12,473,108 B1
(45) Date of Patent: Nov. 18, 2025

(54) STATIONS FOR GUIDED DOCKING EVOLUTIONS BY AERIAL VEHICLES

(71) Applicant: Amazon Technologies, Inc., Seattle, WA (US)

(72) Inventors: Oleksii Krasnoshchok, Gdynia (PL); Hong-Bin Koh, New Taipei (TW); Grzegorz Rozek, Cracow (PL); Ismail Gungor, Gdansk (PL); Anay Joshi, Gdansk (PL); Matthew J. England, Santa Monica, CA (US); Gregory Jerard Wiese, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 34 days.

(21) Appl. No.: 18/541,731

(22) Filed: Dec. 15, 2023

(51) Int. Cl.
| | |
|---|---|
| *B64U 70/95* | (2023.01) |
| *B64U 50/37* | (2023.01) |
| *B64U 70/97* | (2023.01) |
| B64U 10/13 | (2023.01) |
| B64U 30/299 | (2023.01) |

(52) U.S. Cl.
CPC ............ *B64U 70/95* (2023.01); *B64U 50/37* (2023.01); *B64U 70/97* (2023.01); B64U 10/13 (2023.01); B64U 30/299 (2023.01)

(58) Field of Classification Search
CPC ........ B64U 70/95; B64U 70/97; B64U 70/99; B64U 70/30; B64U 50/37; B64U 30/299; B64U 10/13; B64F 1/007
See application file for complete search history.

(56) References Cited

U.S. PATENT DOCUMENTS

| | | | | |
|---|---|---|---|---|
| 9,139,310 | B1 * | 9/2015 | Wang | B60L 58/12 |
| 9,527,605 | B1 * | 12/2016 | Gentry | G05D 1/0094 |
| 10,274,952 | B2 * | 4/2019 | Cantrell | G05D 1/104 |
| 10,577,126 | B2 * | 3/2020 | Mozer | B64F 1/02 |
| 10,633,115 | B2 * | 4/2020 | Pilskalns | B64U 80/30 |
| 10,710,707 | B2 * | 7/2020 | Chen | B64C 25/08 |
| 10,843,573 | B2 * | 11/2020 | Chen | H02J 7/0044 |
| 10,913,546 | B2 * | 2/2021 | Krauss | B64F 1/18 |
| 11,148,805 | B2 * | 10/2021 | Cooper | B64U 70/97 |
| 11,180,263 | B2 * | 11/2021 | Ratajczak | B64U 30/20 |
| 11,247,775 | B2 * | 2/2022 | Brock | B64U 70/99 |
| 11,453,498 | B2 * | 9/2022 | Martens | B64F 1/32 |
| 11,518,542 | B2 * | 12/2022 | Ducharme | B64U 70/30 |

(Continued)

*Primary Examiner* — Benjamin P Lee
(74) *Attorney, Agent, or Firm* — Athorus, PLLC

(57) ABSTRACT

A docking station for an aerial vehicle includes a frame having an upper rim or perimeter for providing support to the aerial vehicle and defining a depression or a cavity for accommodating portions of the aerial vehicle therein. The depression or cavity includes a plurality of visual markings arranged in a distinct pattern, along with receptacles for receiving landing extensions of an aerial vehicle therein. When an aerial vehicle attempts a docking evolution, a downward-oriented camera of the aerial vehicle captures images of the docking station and detects the plurality of visual markings in the distinct pattern depicted within such images. The aerial vehicle may then execute maneuvers to properly align itself with respect to the distinct pattern during a descent. The frame is formed at angles and from materials that are selected to enable landing extensions of an aerial vehicle to slide into receptacles and complete a docking evolution.

21 Claims, 13 Drawing Sheets

(56) References Cited

U.S. PATENT DOCUMENTS

| | | | |
|---|---|---|---|
| 11,673,690 B2 * | 6/2023 | Dayan | B64U 80/70 244/114 R |
| 11,873,116 B2 * | 1/2024 | Kozlenko | B64U 80/25 |
| 11,912,438 B2 * | 2/2024 | Wankewycz | B64F 1/005 |
| 11,939,080 B2 * | 3/2024 | Cowden | B64U 80/30 |
| 12,134,329 B2 * | 11/2024 | Todeschini | G05D 1/0088 |
| 12,163,297 B1 * | 12/2024 | Airoldi | E01F 3/00 |
| 12,172,777 B2 * | 12/2024 | Carthew | B64U 70/93 |
| 12,183,940 B2 * | 12/2024 | Bell | G05D 1/101 |
| 12,202,634 B1 * | 1/2025 | England | B64U 20/87 |
| 12,205,483 B1 * | 1/2025 | Cao | G08G 5/57 |
| 2007/0228214 A1 * | 10/2007 | Horak | B64U 70/99 244/63 |
| 2012/0271461 A1 * | 10/2012 | Spata | G05D 1/102 706/45 |
| 2012/0271491 A1 * | 10/2012 | Spata | G05D 1/102 701/1 |
| 2015/0069968 A1 * | 3/2015 | Pounds | B60L 53/35 320/109 |
| 2016/0001883 A1 * | 1/2016 | Sanz | B64U 10/13 244/17.23 |
| 2016/0039300 A1 * | 2/2016 | Wang | B64D 35/02 244/58 |
| 2016/0039541 A1 * | 2/2016 | Beardsley | B60L 53/14 701/2 |
| 2016/0144982 A1 * | 5/2016 | Sugumaran | B64F 1/005 244/108 |
| 2016/0311329 A1 * | 10/2016 | Rodriguez | B60L 58/18 |
| 2017/0050749 A1 * | 2/2017 | Pilskalns | B60L 53/14 |
| 2017/0073084 A1 * | 3/2017 | Mozer | B64F 1/02 |
| 2017/0217323 A1 * | 8/2017 | Antonini | B60L 53/18 |
| 2018/0056794 A1 * | 3/2018 | Kim | B60L 53/126 |
| 2019/0308724 A1 * | 10/2019 | Cooper | B64U 80/25 |
| 2020/0031472 A1 * | 1/2020 | Martens | B64D 1/22 |
| 2020/0031473 A1 * | 1/2020 | Martens | B64F 1/32 |
| 2020/0207470 A1 * | 7/2020 | Brock | B64U 70/99 |
| 2021/0031947 A1 * | 2/2021 | Wankewycz | B60L 53/36 |
| 2021/0094687 A1 * | 4/2021 | Brock | B64U 10/60 |
| 2021/0347500 A1 * | 11/2021 | Hagan | B64U 10/13 |
| 2022/0134899 A1 * | 5/2022 | Eide | B64U 70/97 244/115 |
| 2023/0373668 A1 * | 11/2023 | Kozlenko | B64U 70/90 |
| 2024/0278946 A1 * | 8/2024 | Roberts | B64U 10/16 |
| 2024/0308688 A1 * | 9/2024 | Ratajczak | B66C 1/36 |
| 2024/0343426 A1 * | 10/2024 | Cornew | B64U 80/25 |

\* cited by examiner

STATIONS FOR GUIDED DOCKING EVOLUTIONS BY AERIAL VEHICLES

BACKGROUND

Aerial vehicles are most commonly operated in outdoor spaces. When an aerial vehicle operates in an outdoor space, the aerial vehicle may take off from a fixed or mobile location, e.g., a runway, a landing pad, or any like facility or station, by causing motors to generate lift and elevate the aerial vehicle to a selected altitude or position. The aerial vehicle may then travel on any selected courses, speeds or altitudes. Prior to taking off, or while in flight, an aerial vehicle operating outdoors may determine its position in three-dimensional space using a position sensor, e.g., a Global Positioning System ("GPS") receiver that captures signals from one or more satellites or other sources, as well as an inertial measurement unit (or "IMU"), one or more altimeters, barometers, or other components. An aerial vehicle may rely on such sensors to travel to a specific location, which may be the same location from which the aerial vehicle took off, or a different location, before completing a landing evolution.

Operating an aerial vehicle, or drone, within indoor spaces presents a unique set of challenges for the aerial vehicle, and creates unique risks for occupants or contents of the indoor spaces. In particular, whereas aerial vehicles that operate outdoors may commonly utilize large, open areas to maneuver during takeoff and landing evolutions, an aerial vehicle that operates indoors, which are often constrained by narrow hallways or other passageways, and feature limited operating areas between floors and ceilings, must usually maneuver and execute takeoff or landing evolutions with precision.

Furthermore, unlike aerial vehicles that operate within outdoor spaces, which may receive power, connectivity and other services from systems of any size, shape or location, an aerial vehicle that operates indoors may preferably receive such services from systems that conform to dimensions of the spaces in which the aerial vehicle operates, and are preferably limited in size with respect to the aerial vehicle and any other objects within such spaces.

DETAILED DESCRIPTION

Figure 1A:
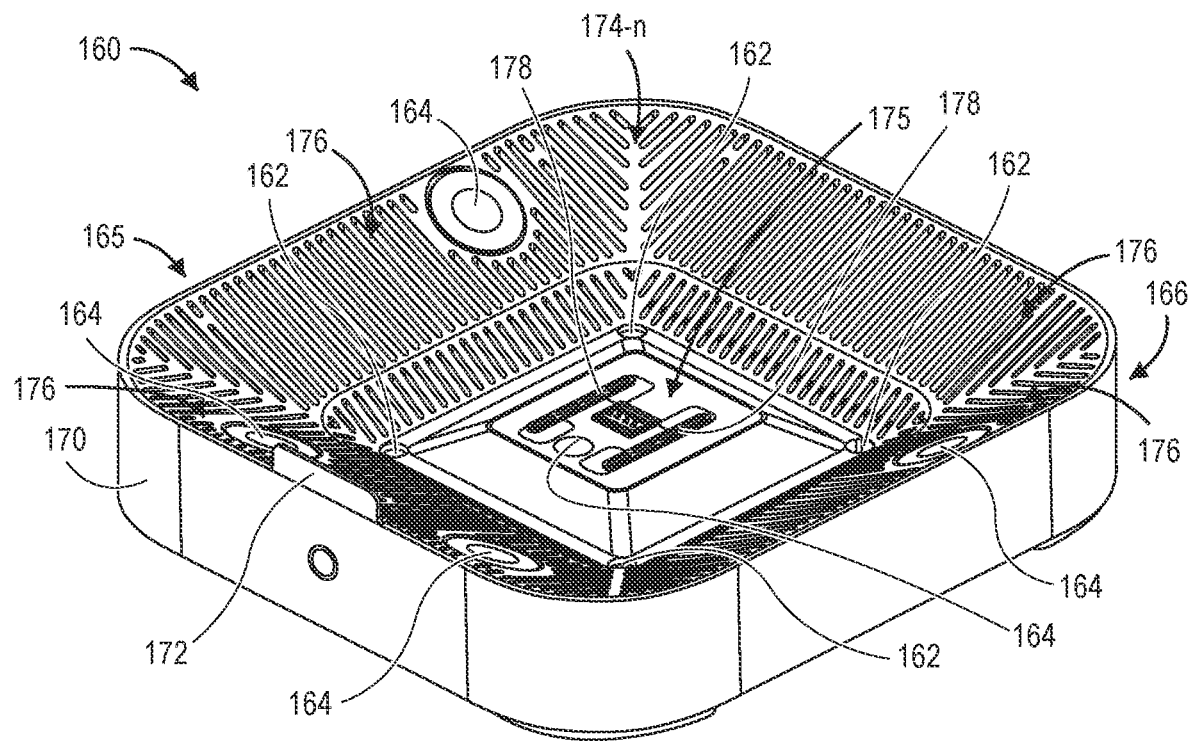
FIGS. 1A through 1E are views of aspects of one system in accordance with embodiments of the present disclosure.
Figure 1A:
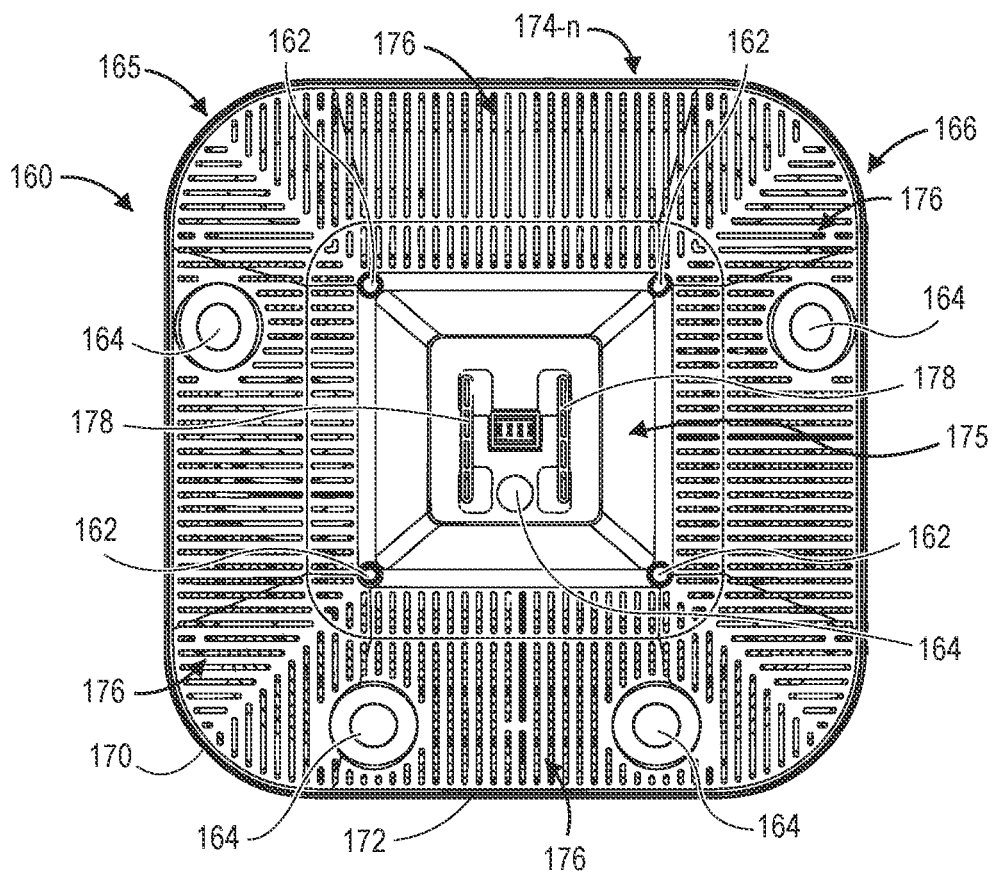

As is set forth in greater detail below, the present disclosure is directed to docking stations (or docks) for use in docking evolutions by aerial vehicles (e.g., drones) that are configured for operation within indoor spaces. More specifically, the aerial vehicles feature lightweight housings or bodies having comparatively low profiles that are outfitted with suites of sensors for monitoring conditions of the indoor spaces, such as LIDAR (or light detection and ranging) sensors, time-of-flight sensors, radio transceivers, cameras or other imaging devices, or others, that may be aligned at any angle with respect to an orientation or configuration of an aerial vehicle.

The docking stations of the present disclosure may include frames or other features that correspond in size, shape or dimensions with housings or bodies of aerial vehicles that are configured to dock or land thereon. For example, in some implementations, docking stations and aerial vehicles may each feature square or substantially square cross-sections with substantially constant heights. The docking stations may include frames that define depressions or cavities for accommodating portions of the aerial vehicles therein. Such frames may be partially solid (e.g., slotted or meshed) sections in nature that are sufficiently strong and durable to provide support for the aerial vehicles while docked therein, and include openings (e.g., slit openings) that are sized, shaped and aligned to enable propeller wash from the aerial vehicles to pass therethrough and out of the docking stations without interfering with the completion of a docking evolution.

Depressions or cavities of docking stations of the present disclosure may further include a plurality of markings or other indicators that are arranged in discrete or unique patterns and may be recognized by an aerial vehicle during a docking evolution. For example, the markings or indicators may be arranged in an asymmetric, unique pattern that may be detected within images captured by one or more cameras of the aerial vehicle prior to or during a descent to the docking station. Upon detecting the markings or indicators of the docking station, the aerial vehicle may adjust a pose, e.g., by rotating or otherwise adjusting the aerial vehicle to ensure that the aerial vehicle remains in proper alignment with the docking station. The markings or indicators provided within such cavities may be passive or active in nature, and may take any form, such as light sources (e.g., light-emitting diodes, or "LED") or light reflectors, which may be retroreflective in nature, or may have any other reflective properties.

Surfaces of frames of docking stations may be shaped and configured to receive an aerial vehicle in a proper alignment within a docking station following a docking evolution. For example, aerial vehicles of the present disclosure may include one or more landing pegs, struts, "feet" (or "landing feet"), or other extensions or appurtenances that extend below the aerial vehicle to enable the aerial vehicle to land on any substantially flat surface. Depressions or cavities of docking stations of the present disclosure may further include a plurality of receptacles, recesses or other openings that are sized and aligned for receiving such extensions of the aerial vehicle therein. Moreover, within such depressions or cavities, surfaces of the frames of the docking stations may be formed from selected materials and aligned at slopes that are sufficient to cause aerial vehicles that attempt to dock within the docking stations to reposition themselves into proper locations and orientations. For example, slopes and materials of surfaces within depressions or cavities within frames of docking stations may be selected to cause extensions or appurtenances extending below an aerial vehicle that come into contact with such surfaces to slide toward receptacles, recesses or openings that are sized and located to accommodate such extensions or appurtenances.

The docking stations of the present disclosure may provide support for aerial vehicles prior to or following the performance of any number of operations or evolutions by the aerial vehicles within indoor spaces. For example, one or more of the docking stations of the present disclosure may be utilized by an aerial vehicle that is programmed or configured to monitor any events or conditions occurring within an indoor space, or to confirm or verify the existence or presence of any such events or conditions, e.g., any hazardous, abnormal or undesirable events or conditions, or evaluate the spaces regularly or periodically, or at scheduled or random times.

Referring to FIGS. 1A through IE, views of aspects of one system in accordance with embodiments of the present disclosure are shown. FIG. 1A is a perspective view of a docking station 160.

As is shown in FIG. 1A, the docking station 160 includes a frame 165 and a housing 170. The frame 165 defines a depression 175 or another cavity for accommodating portions of an aerial vehicle therein. The frame 165 includes an upper edge, a bottom section having a shape of a square, or a shape similar to that of a square (e.g., a rounded square, or squircle), and a plurality of angled edge sections having sloped surface descending down at angles from the upper edge to the bottom section. The frame 165 further includes a plurality of receptacles (or recesses or other openings) 162 that are sized and aligned to accommodate landing pegs, struts, landing feet or other appurtenances at ends of landing extensions of an aerial vehicle therein, as well as a plurality of markers (or markings) 164 within the depression 175 formed by the angled edge sections and the bottom section. The markers 164 may be visual in nature and may include any letter, symbol, icon or other indicator that may be detected within images captured by a camera of an aerial vehicle. In some implementations, one or more of the markers 164 may be any number of reflective surfaces (e.g., retroreflectors) or other features that enhance the capacity of the markers 164 to be detected within such images. In some implementations, an aerial vehicle performing a docking evolution into the docking station 160 may project infrared light or light at any other wavelength or frequency into the depression 175 by one or more illuminators, and the markers 164 may include features that enhance their visibility in the presence of infrared light or light at such other wavelengths or frequencies.

In some implementations, one or more of the markers 164 may be a source of light, such as a light-emitting diode, or "LED," that project visual light that may be detected by one or more cameras or optical sensors of an aerial vehicle. Moreover, in some implementations, the markers 164 may include or be replaced by transmitters of any type or form of energy, e.g., short-range wireless radiofrequency transmissions, that may be captured by one or more sensors configured to receive such energy and determine distances between such sensors and such transmitters, e.g., based on times of flight of such energy.

Attributes or features of the frame 165 may be selected to cause aerial vehicles that attempt to dock with the docking station 160 to slide or otherwise reposition within the depression 175, subject to gravitational forces. For example, the placement or the arrangement of the receptacles 162 within the depression 175, e.g., in a shape of a square or another rectangle, may be selected based on positions of the ends of landing extensions of an aerial vehicle that is intended to dock with the docking station 160. Slopes of the angled edge sections and dimensions of the bottom section may be selected to cause the aerial vehicle to travel into a proper alignment with respect to the docking station 160, such as when one or more of the landing extensions is in contact with one or more of the angled edge sections. Moreover, materials from which the angled edge sections and the bottom section are formed may be selected based on their respective properties of friction. For example, in some implementations, an upper surface of the frame 165, or other portions of the frame 165, may be formed from any type of plastics (e.g., low-friction plastics) having desired properties of friction, including but not limited to low-friction plastics such as nylons, polyethylenes such as polyethylene sulfide, polyethylene terephthalate or other thermoplastics, polyetheretherketones, polytetrafluoroethylenes, or others.

The placement and the arrangement of the receptacles 162, the angles of the frame 165 and the materials from which the frame 165 and the landing extensions are formed may thus enhance the reliability of the docking station 160 and require less precision from aerial vehicles attempting to complete docking evolutions within the docking station 160.

The housing 170 includes a substantially flat base (not shown in FIG. 1A) and a plurality of walls extending normal to the base. The walls of the housing 170 define an upper rim that mates with or contacts the upper edge of the frame 165. The housing 170 further includes a raised extension 172 (or privacy cover or privacy member) extending from and above one of the walls of the housing 170 that extends above the upper edge of the frame 165. Additionally, the angled edge sections and the bottom section of the frame 165 further include a plurality of openings 174-$n$ (e.g., slits or slit openings) that are aligned or arranged in groups in parallel. The openings 174-$n$ enable downward airflow from an aerial vehicle that is taking off, landing on or into, or otherwise hovering over the docking station 160 to pass through the frame 165 and discharge laterally outwardly therefrom. The openings 174-$n$ may also provide ventilation for any electronic components provided within the frame 165, e.g., power or communications systems for providing electrical power or data to aerial vehicles. For example, as is shown in FIG. 1A, each of the openings 174-$n$ provided in one of the edge sections is oriented such that a lengthwise direction of each of the openings 174-$n$ is aligned in a direction of a slope of the edge section in which the openings 174-$n$ are provided.

The flat surfaces of the frame 165 may also include one or more contacts (or connectors, e.g., charging contacts or charging connectors) 178 or other features for mating with corresponding contacts (or connectors) of an aerial vehicle, such as one or more contacts (or connectors, e.g., charging contacts or charging connectors) provided on an underside or other portion of the aerial vehicle that is inserted into or enters the cavity defined by the frame 165. The contacts 178 enable electrical power, information or data to be conveyed between the aerial vehicle and the docking station 160. The housing 170 may further include one or more openings to facilitate the carrying of the docking station 160 by hand.

The plurality of receptacles 162 are provided at corners of the bottom section of the frame 165, and arranged in a shape of a square or another rectangle. For example, as is shown in FIG. 1A, each of the receptacles 162 is provided within a channel defined by the bottom section of the frame, or at the intersection of two of such channels. The channels are arranged in the shape of a square or another rectangle about the bottom section of the frame 165.

The plurality of markers 164 includes five markers provided at various locations on upper surfaces of the frame 165 and in a discrete arrangement, e.g., in a shape of a letter W, that is irregular or asymmetric with respect to one or more axes and is uniquely oriented with respect to a position and an orientation of the docking station 160. Thus, when an aerial vehicle attempts a docking evolution at the docking station 160, and one or more cameras or other imaging devices of the aerial vehicle captures an image of the frame 165, the aerial vehicle may detect the markers 164 at various locations on the upper surface of the frame 165. The aerial vehicle may then determine an orientation of the docking station 160 from such markings, and may reorient itself with respect to the docking station 160 as necessary, e.g., by traveling to a selected position and rotating about a yaw axis, prior to or during a descent in order to complete a docking evolution based on the detected orientation of the docking station 160. Alternatively, in some implementations, where the plurality of markers 164 include one or more transmitters, and where the aerial vehicle includes one or more sensors or other receivers, the aerial vehicle may capture transmissions of the radiofrequency energy by such transmitters and determine distances to such transmitters from such transmissions. The aerial vehicle may then reorient itself based on such transmissions, e.g., by traveling to a selected position and rotating about a yaw axis, prior to or during a descent in order to complete a docking evolution based on the detected orientation of the docking station 160.

The bottom section of the frame 165 may further include one or more contacts (or connectors) 178 for providing services to aerial vehicles that are docked within the docking station 160. For example, such contacts 178 enable electrical power, information or data to be conveyed between an aerial vehicle and the docking station 160. Additionally, within an enclosure defined by the frame 165 and the housing 170, the docking station 160 may further include any number of fans or other equipment for reducing or raising a temperature of the docking station 160 or aerial vehicles docked therewith, or maintaining the docking station 160 or such vehicles at any desired temperatures or in any other conditions.

The docking station 160 may have any dimensions in accordance with implementations of the present disclosure. For example, a height of the docking station 160 may be substantially smaller than a length or a width of the docking station 160. In some implementations, the docking station 160 may have lengths and widths of approximately twenty-five to thirty centimeters (25-30 cm), and a height of approximately five to ten centimeters (5-10 cm). In some other implementations, a height or depth of the depression 175 within the frame 165 may be selected on any basis. For example, a height or depth of the depression 175 may be selected based on lengths of landing extensions extending below housings of aerial vehicles that are intended to dock within the docking station 160.

Figure 1B:
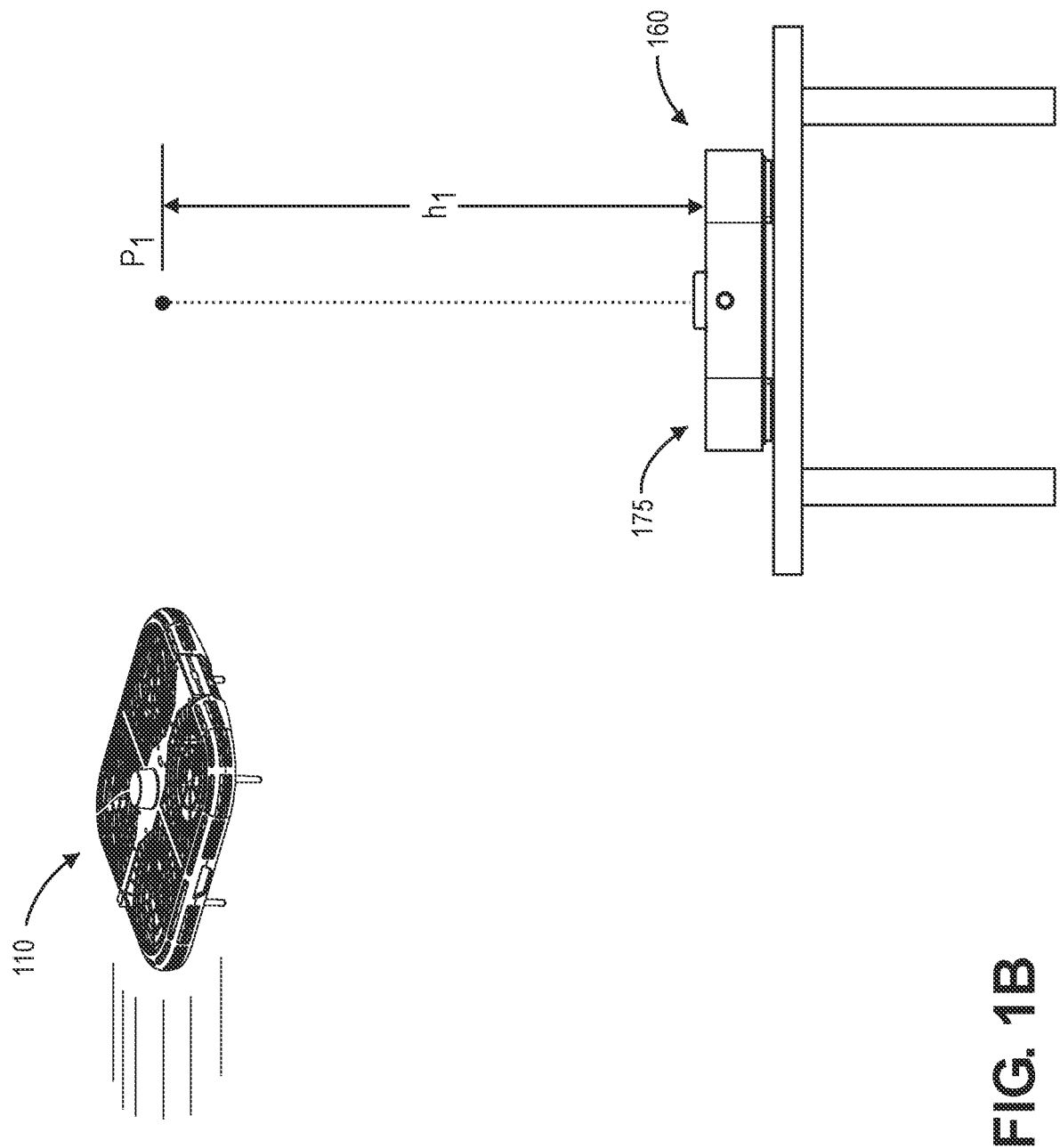

As is shown in FIG. 1B, an aerial vehicle 110 approaches the docking station 160, which is provided on a table or another platform-like surface. The aerial vehicle 110 may include a housing formed from any number of sections, e.g., an upper section, a lower section, and a shroud or side section, as well as any number of chambers for accommodating one or more other sensors, control systems, processors, circuitry or other components. The aerial vehicle 110 may further include any number of motors, propellers or other systems within such housings that may be powered by electricity or any other fuel source or prime mover, and configured to generate forces of thrust and/or lift to the aerial vehicle 110 and any payload engaged thereby. The aerial vehicle 110 defines a substantially square cross-section, e.g., a substantially planar cross-section in the shape of a square with rounded corners or edges, or a squircle, with a substantially constant height, and a length and a width that are each substantially greater than the height. In some implementations, a ratio of the length or the width of a housing of the aerial vehicle 110 to the height of the housing of the aerial vehicle 110 may be approximately six-to-1, or 6:1. Alternatively, in some implementations, the housing of the aerial vehicle 110 may have cross-sections of any other shape or size, e.g., rectangles other than squares, triangles, or any other polygons, or circles or any other curvilinear shapes, and may have any dimensions.

The aerial vehicle 110 also includes any number of landing extensions or appurtenances extending below the aerial vehicle 110 that enable the aerial vehicle 110 to complete a landing evolution on any substantially flat surface. For example, the landing extensions may include pegs, feet or other portions that extend below a lowest point of the housing of the aerial vehicle 110, and are aligned in a common plane, such that the aerial vehicle 110 may land on a substantially flat landing surface with each of the ends of the pegs in contact with the landing surface, and no other portion of the aerial vehicle 110 in contact with the landing surface. In some implementations, the landing extensions or portions thereof (e.g., pegs, feet, or other portions), may be formed from any type of plastics, such as low-friction plastics, having desired properties of friction, e.g., nylons, polyethylenes such as polyethylene sulfide, polyethylene terephthalate or other thermoplastics, polyetheretherketones, polytetrafluoroethylenes, or others. Furthermore, in some implementations, the landing extension or portions thereof may be formed form the same materials as the upper surface of the frame 165.

For example, as is shown in FIG. 1B, the aerial vehicle 110 may execute one or more sets of instructions to calculate a trajectory toward a point $P_1$ in space located at a height $h_1$ above the docking station 160, and operate one or more motors to cause the aerial vehicle 110 to travel along the trajectory toward the point $P_1$. The aerial vehicle 110 may determine its positions and orientations while traveling toward the point $P_1$ using data captured by one or more navigation sensors, e.g., a light detection and ranging ("LIDAR") sensor or time-of-flight sensor 130-1, an IMU, or any other sensors. The aerial vehicle 110 may determine its positions and orientations according to one or more simultaneous localization and mapping (or "SLAM") techniques, or by any other techniques.

Figure 1C:
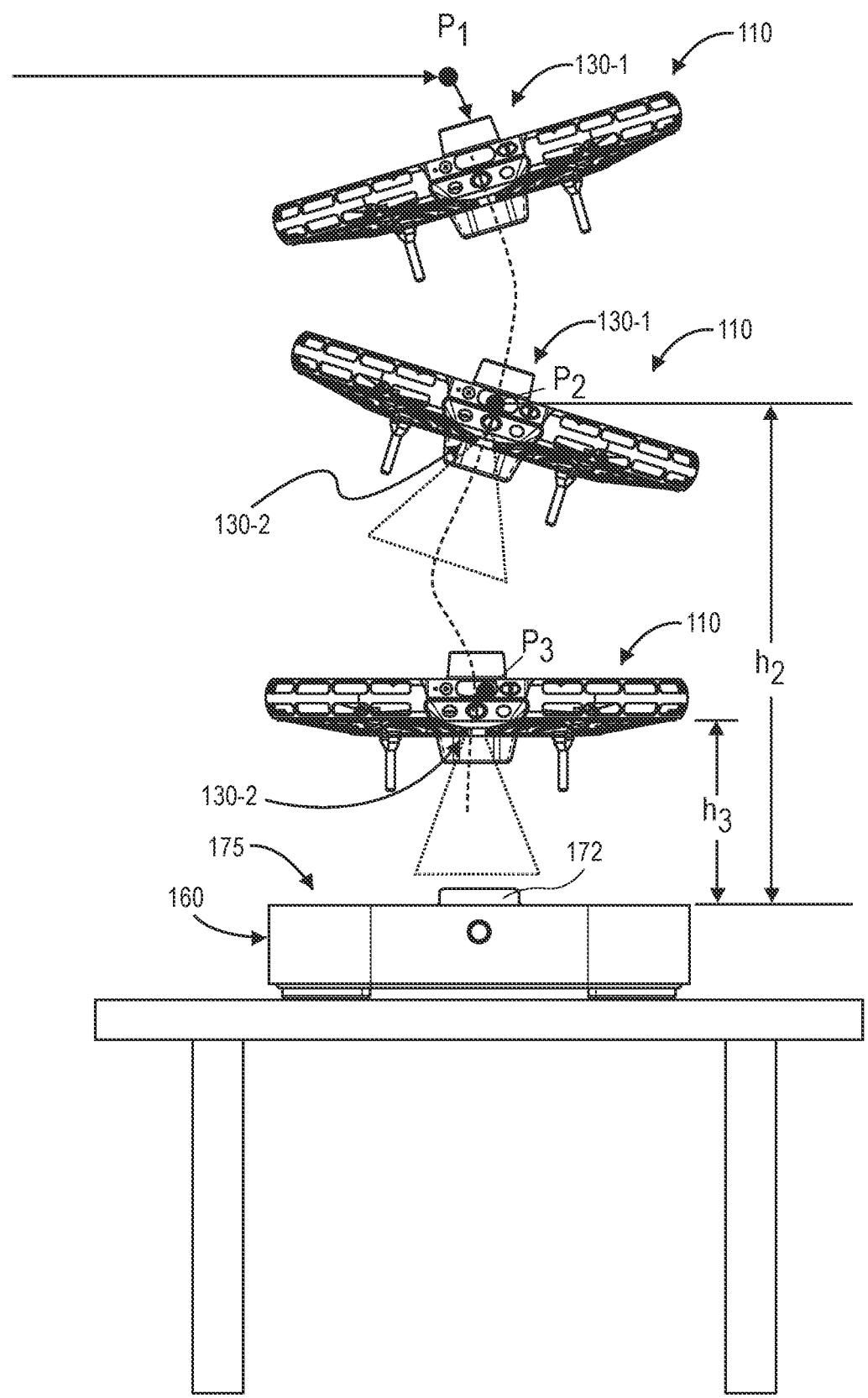

As is shown in FIG. 1C, upon arriving at or near the point $P_1$, the aerial vehicle 110 may initiate a docking evolution, and rely upon navigation sensors to determine its position and/or orientation while descending toward a point $P_2$ in space located at a height $h_2$ above the docking station 160 during the docking evolution. Upon arriving at or near the point $P_2$, the aerial vehicle 110 begins capturing images or other data using an imaging device 130-2 provided on an underside of the aerial vehicle 110. The imaging device 130-2 has a field of view extending below the aerial vehicle 110, e.g., along or parallel to a yaw axis of the aerial vehicle 110.

The aerial vehicle 110 may process images captured using the imaging device 130-2 to determine its position and/or orientation in three-dimensional ("3D") space or with respect to the docking station 160. Upon or prior to arriving at a point $P_3$ in space located at a height $h_3$ above the docking station 160, the aerial vehicle 110 may compare positions and/or orientations determined using the images captured by the aerial vehicle 110 to positions and/or orientations of the aerial vehicle 110 determined using the data captured by the one or more navigation sensors, the aerial vehicle 110 continues a descent toward a point $P_3$ in space located at a height $h_3$ above the docking station 160.

Figure 1D:
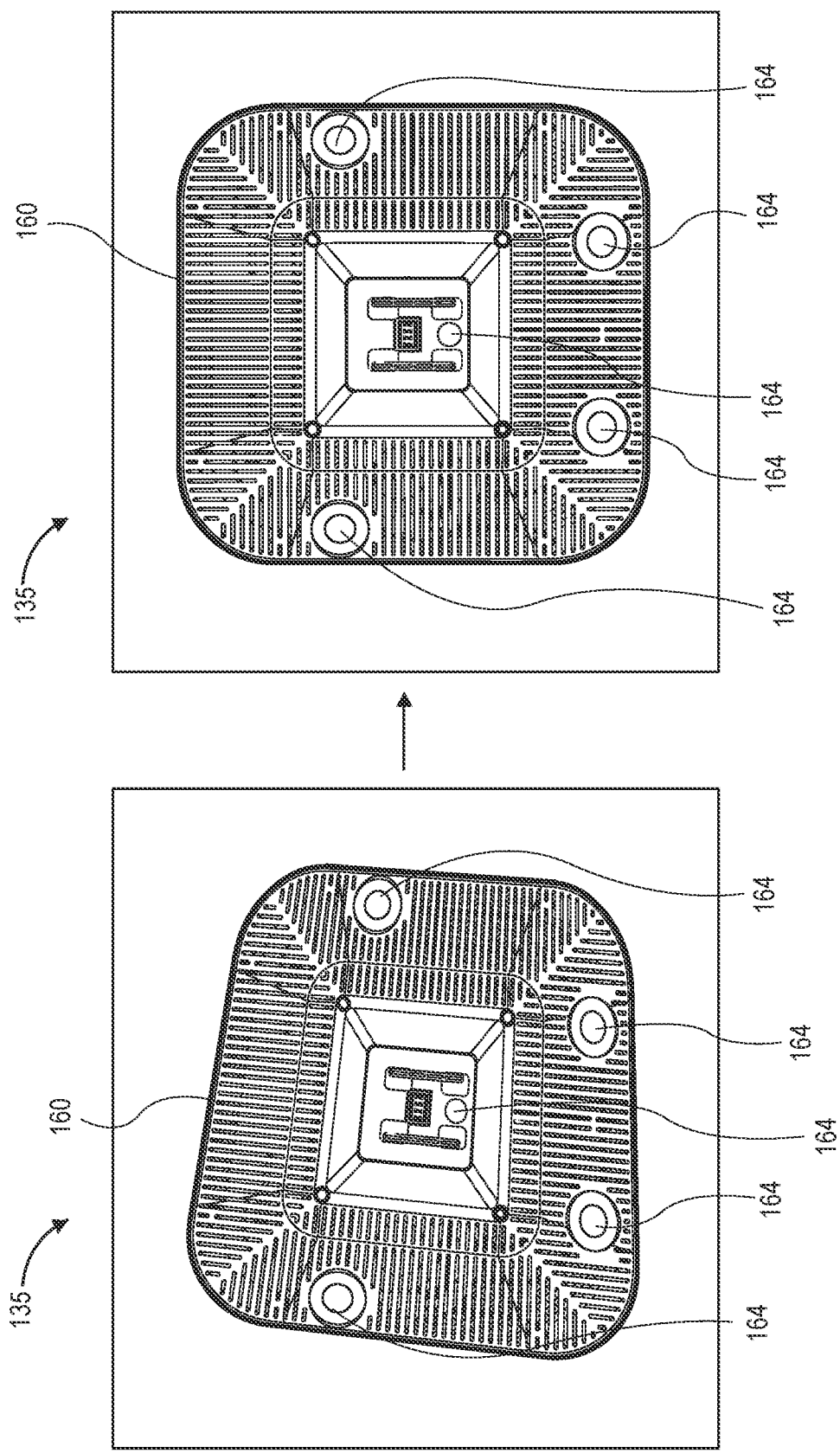

As is shown in FIG. 1D, the aerial vehicle 110 may determine a position and an orientation with respect to the docking station 160 by detecting the markers 164 within images 135 captured by the imaging device 130-2 and transforming the images 135. Upon determining the position and orientation of the aerial vehicle 110 with respect to the docking station 160, the aerial vehicle 110 may execute one or more maneuvers, e.g., to reposition the aerial vehicle 110 along or about one or more of a yaw axis, a pitch axis and a roll axis, and cause the aerial vehicle 110 to be properly oriented with respect to the markers 164 and the frame 165.

Figure 1E:
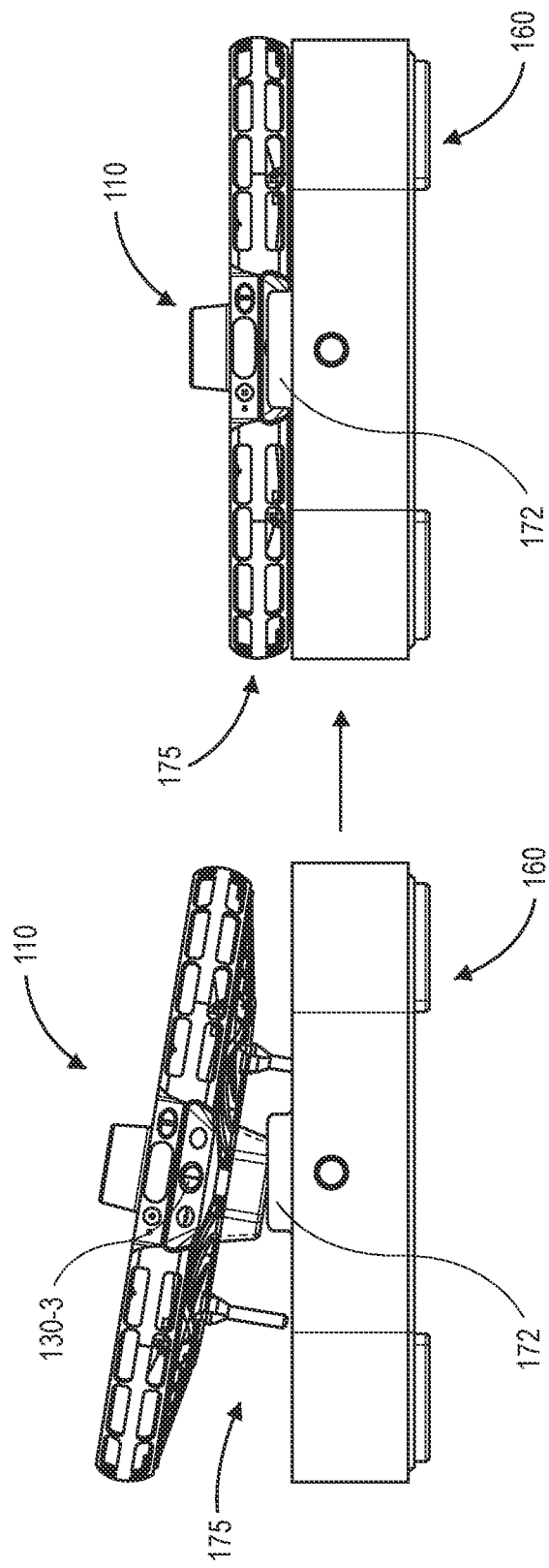

After confirming its position and orientation based on images captured using the imaging device 130-2, the aerial vehicle 110 may continue a descent toward the docking station 160, and cause the landing extensions to enter the depression 175. As is shown in FIG. 1E, where one or more of the landing extensions of the aerial vehicle 110 is within the depression 175, e.g., below the upper rim of the frame 165, the aerial vehicle 110 may stop the operation of motors or propellers providing lift to the aerial vehicle 110, thereby causing the aerial vehicle 110 to descend into place within the depression 175, and to dock with the docking station 160.

With the aerial vehicle 110 docked with the docking station 160, the raised extension 172 obscures a lens or another optical component of an imaging device 130-3, which has a field of view extending laterally or radially outward from the aerial vehicle 110, e.g., within a plane defined by the housing of the aerial vehicle 110, or by a roll axis and a pitch axis of the aerial vehicle 110, and perpendicular to the yaw axis of the aerial vehicle 110. Additionally, with the aerial vehicle 110 docked with the docking station 160, the contacts 178 of the frame may come into contact with corresponding contacts (or connectors) provided on an underside or other portion of the aerial vehicle 110, enabling electrical power, information or data to be conveyed between the aerial vehicle 110 and the docking station 160.

Aerial vehicles of the present disclosure may be utilized or configured for any number or type of missions or operations. In some implementations, aerial vehicles of the present disclosure may be programmed or configured to generate one or more environment maps of indoor spaces within a facility, based on images or other data captured by one or more sensors. An environment map may identify or depict one or more boundaries (e.g., walls, ceilings, floors) or other aspects of indoor spaces, as well as the respective dimensions of such spaces, or the respective surfaces or textures of such boundaries. In some embodiments, an aerial vehicle may autonomously travel throughout an indoor space in order to capture data using one or more sensors, and such data may be utilized in generating an environment map of the indoor space. In some other embodiments, the aerial vehicle may be transported (e.g., carried) or escorted by a human actor throughout an indoor space, and may capture data using one or more sensors as the aerial vehicle is transported or escorted throughout the indoor space. Data captured as the aerial vehicle is escorted may be utilized in generating an environment map of the indoor space. Additionally, in some embodiments, the aerial vehicle may selectively operate one or more propulsion motors as the aerial vehicle is transported or otherwise escorted throughout an indoor space, in order to maintain altitude and/or tilt control. Furthermore, in some embodiments, data captured by the aerial vehicle as the aerial vehicle travels throughout the indoor space may be adjusted to account for presence of one or more body parts of a human actor that is transporting or otherwise escorting the aerial vehicle through the indoor space. Additionally, an environment map generated based on data captured using one or more sensors of an aerial vehicle may further include one or more layers identifying locations of utilities, services or other systems within an indoor space.

Aerial vehicles of the present disclosure may be configured to operate any access-related systems within an indoor space, including any portals or other systems, or to enable communication with persons within an indoor space via one or more secure communications channels (e.g., voice, video and/or data). In some embodiments, an aerial vehicle may be programmed or instructed to automatically open a door or other entry point in a home, an office or another structure (e.g., a private dwelling or business location), to access a public garage or other parking or standing area, or to activate an indication within an indoor space. For example, an aerial vehicle may be configured to transmit wireless codes, signals or other information to trigger a response from one or more devices or machines equipped with wireless transceivers, such as garage door openers, doorbells, lights, haptic feedback systems or other machines or devices. Aerial vehicles may also be configured to share any relevant information or data with persons, while preventing such persons from accessing any other sensitive information or data within the indoor space. Aerial vehicles may be further configured to communicate with any other vehicles or systems within an indoor space, including but not limited to cleaning robots, servicing robots, domestic robots, household robots, monitoring and/or surveillance robots, or robots of any other kind, e.g., to provide one or more instructions for performing one or more tasks within the indoor space.

In accordance with some embodiments of the present disclosure, an aerial vehicle may be configured to operate along with one or more docking stations, e.g., base components, charging docks (or charging stations or docking stations), or other intermediary devices. Such stations may have openings, cavities or spaces configured to accommodate one or more portions of an aerial vehicle, and may include one or more surfaces that are aligned to come into contact with corresponding surfaces of the aerial vehicle, thereby enabling electrical power, information or data to be conveyed between the aerial vehicle and such stations. In some embodiments, a base component, a charging dock, or another intermediary device may include an opening, a cavity or another space that is sized and shaped to receive or accommodate a specific portion of an aerial vehicle, e.g., a fuselage of the aerial vehicle, and to enable the aerial vehicle to be aligned in one of a plurality of alignments or orientations with respect to the base component, the charging dock or intermediary device.

For example, in some embodiments, an aerial vehicle may also include one or more contacts (or connectors, e.g., charging contacts or charging connectors) that are positioned or aligned in an arrangement or pattern on an external surface of a portion of the aerial vehicle, e.g., a fuselage of the aerial vehicle, that is designed to contact corresponding portions of a base component, a charging dock or another intermediary device. One or more internal surfaces of the base component, the charging dock or the intermediary device may include contacts (or connectors, e.g., charging contacts or charging connectors) that are positioned or aligned in an arrangement or pattern that is consistent with arrangements or patterns of contacts on external surfaces of an aerial vehicle, such that the contacts on the external surface of the portion of the aerial vehicle and the contacts on the one or more internal surfaces of the base component, the charging dock or the intermediary device mate or otherwise come into contact with one another when the portion of the aerial vehicle is in one of a plurality of predetermined alignments or orientations.

In some embodiments, an aerial vehicle may include one or more cameras or other optical sensors having fields of view that extend below the aerial vehicle and are aligned to capture imaging data while the aerial vehicle executes one or more landing evolutions. Thus, when the portion of the aerial vehicle attempts to land on a docking station or at another location, such cameras or other optical sensors may be used to guide the aerial vehicle onto the docking station or another landing surface.

Moreover, aerial vehicles of the present disclosure may be configured for use or operation within indoor spaces or facilities of any kind. As used herein, the term "facility" shall refer to any building, region, structure or other space (e.g., covered or uncovered), such as a home of any type, kind, shape or form, including but not limited to a house, an apartment, a condominium, a dormitory, a barracks, or any other defined or undefined structure having one or more living spaces. A facility may also be a business-related structure such as a building, an office, a shopping center, a restaurant, a post office, a grocery store, a department store, a materials handling facility, or any other defined or undefined structure having one or more commercial areas. A facility may also be any other type of facility including but not limited to stadiums, ballfields, transportation centers or financial institutions (e.g., banks).

In some implementations, the aerial vehicles of the present disclosure may be dispatched or otherwise instructed to travel to one or more locations, to capture images or other data in such locations, and to determine whether a predetermined event or condition (e.g., an alarm event or condition) is occurring or has occurred at the one or more locations. In some embodiments, the aerial vehicles may be dispatched or instructed to travel to such locations directly, e.g., in response to one or more sets of instructions received from an external computer device over one or more networks.

The aerial vehicles of the present disclosure may take any action in response to determining that one or more sensors has detected a predetermined event or condition, or upon processing or otherwise analyzing data captured from one or more spaces within a facility. For example, an aerial vehicle may affirmatively determine, e.g., to various levels of confidence, that a predetermined event or condition has occurred in one or more spaces within a facility or, alternatively, that the predetermined event or condition has not occurred in such spaces. Alternatively, the aerial vehicles of the present disclosure may transmit images or other data captured from such spaces to one or more external computer devices or systems, such as a base component or other station configured to charge the aerial vehicles with electrical power (e.g., a base component, a charging dock, or another intermediary device or system) within the facility or, alternatively, to a server or other computer device or system provided in one or more alternate or virtual locations, e.g., in a "cloud"-based environment. The images or other data may be transmitted independently or along with one or more measures of a level of confidence (e.g., a confidence score) as to whether a predetermined event or condition has occurred or is present within the one or more spaces. Subsequently, the external computer device or system may make a determination, based on the images or other data, or any other data captured by one or more sensors present within such spaces or in any other location, whether a predetermined event or condition has occurred or is present within such spaces, or whether the predetermined event or condition has not occurred or is not present in such spaces.

Moreover, upon determining that a predetermined event or condition has occurred or is present within one or more spaces of a facility, an aerial vehicle of the present disclosure, or a base component, a docking station or another intermediary device in communication with the aerial vehicle, may transmit one or more requests or sets of instructions requesting additional resources at such spaces to one or more external computer devices or systems.

Figure 2:
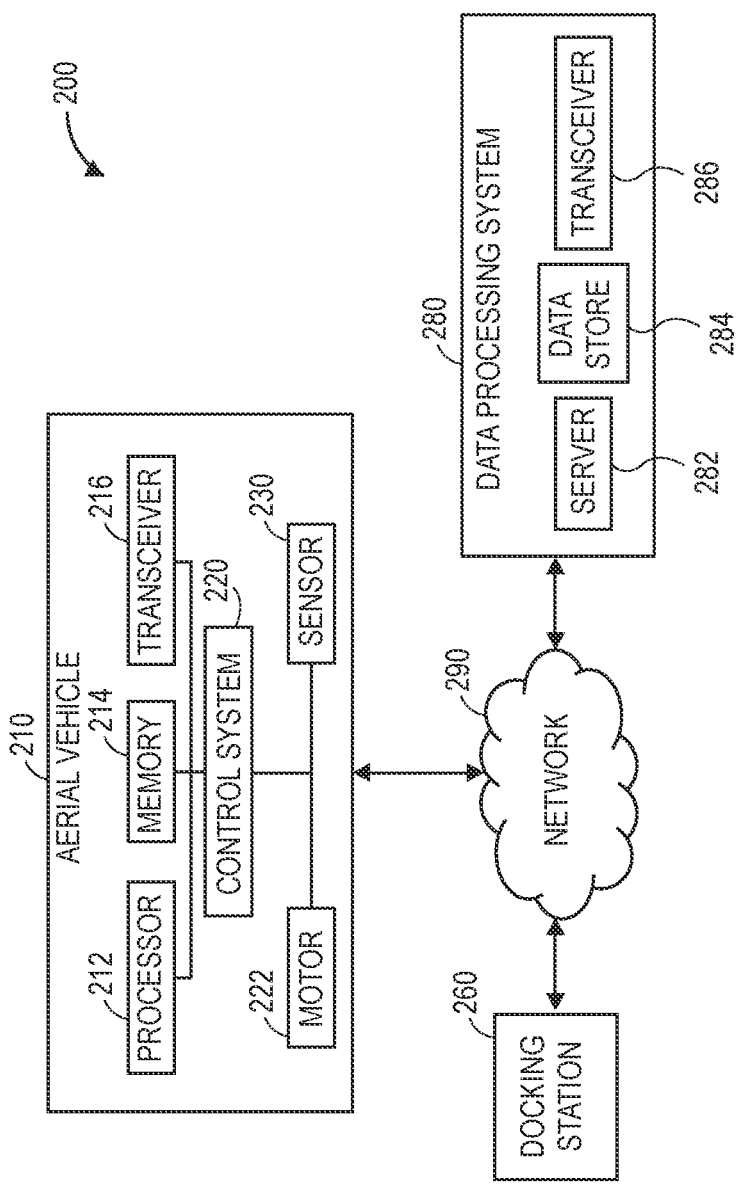
FIG. 2 is a block diagram of one system including an aerial vehicle in accordance with embodiments of the present disclosure.

Referring to FIG. 2, a block diagram of components of one system including an aerial vehicle in accordance with embodiments of the present disclosure is shown. The system 200 includes the aerial vehicle 210, a docking station 260 and a data processing system 280 that are connected to one another across a network 290, which may include the Internet in whole or in part. Except where otherwise noted, reference numerals preceded by the number "2" shown in FIG. 2 refer to elements that are similar to elements having reference numerals preceded by the number "1" shown in FIGS. 1A through 1E.

The aerial vehicle 210 may be any type or form of aerial vehicle (e.g., an unmanned aerial vehicle, or drone) that may be programmed or configured to autonomously perform one or more operations within indoor spaces of a facility. As is shown in FIG. 2, the aerial vehicle 210 includes a processor 212, a memory 214 and a transceiver 216. The aerial vehicle 210 further includes a control system 220, one or more motors 222, and one or more sensors 230.

The processor 212 may be configured to perform any type or form of computing function associated with the operation of the aerial vehicle 210. For example, the processor 212 may be configured to execute any other algorithms or techniques (e.g., machine learning systems or techniques) associated with one or more applications, purposes or functions, such as navigation, monitoring or collision avoidance, or to select at least one of a course, a speed or an altitude for the safe operation of the aerial vehicle 210. The processor 212 may be configured to control any aspects of the operation of the aerial vehicle 210 and any computer-based components thereon, including but not limited to the motors 222 or the sensors 230. For example, the processor 212 may control the operation of one or more control systems or modules, such as the control system 220, for generating instructions for conducting operations of one or more of the motors 222 or the sensors 230. Such control systems or modules may be associated with one or more other computing devices or machines, and may communicate with the docking station 260, the data processing system 280 or one or more other computer devices over the network 290, through the sending and receiving of digital data.

The processor 212 may be a uniprocessor system including one processor, or a multiprocessor system including several processors (e.g., two, four, eight, or another suitable number), and may be capable of executing instructions. For example, in some embodiments, the processor 212 may be a general-purpose or embedded processor unit such as a CPU or a GPU having any number of instruction set architectures (ISAs), such as the x86, PowerPC, SPARC, or MIPS ISAs, or any other suitable ISA. Where the processor 212 is a multiprocessor system, each of the processors within the multiprocessor system may operate the same ISA, or different ISAs.

Additionally, the aerial vehicle 210 further includes one or more memory or storage components 214 (such as databases or data stores) for storing any type of information or data, e.g., instructions for operating the aerial vehicle 210, or information or data captured during operations of the aerial vehicle 210. The memory 214 may be configured to store executable instructions, imaging data, paths or routes, control parameters and/or other data items accessible by or to the processor 212. The memory 214 may be implemented using any suitable memory technology, such as random-access memory (or "RAM"), static RAM (or "SRAM"), synchronous dynamic RAM (or "SDRAM"), non-volatile/ Flash-type memory, or any other type of memory. In some embodiments, program instructions, imaging data, flight paths, flight control parameters and/or other data items may be received or sent via the transceiver 216, e.g., by transmission media or signals, such as electrical, electromagnetic, or digital signals, which may be conveyed via a communication medium such as a wired and/or a wireless link.

The transceiver 216 may be configured to enable the aerial vehicle 210 to communicate through one or more wired or wireless means, e.g., wired technologies such as Universal Serial Bus (or "USB") or fiber optic cable, or standard wireless protocols or standards such as Bluetooth or any Wi-Fi protocol, over the network 290 or directly. The transceiver 216 may further include or be in communication with one or more input/output (or "I/O") interfaces, and may be configured to allow information or data to be exchanged between one or more of the components of the aerial vehicle 210, or to one or more other computer devices or systems (e.g., other aerial vehicles, not shown) via the network 290. For example, in some embodiments, the transceiver 216 may be configured to coordinate I/O traffic between the processor 212 and one or more onboard or external computer devices or components, e.g., the control system 220, or the motors 222 or sensors 230. The transceiver 216 may perform any necessary protocol, timing or other data transformations in order to convert data signals from a first format suitable for use by one component into a second format suitable for use by another component. In some embodiments, the transceiver 216 may include support for devices attached through various types of peripheral buses, e.g., variants of the Peripheral Component Interconnect (PCI) bus standard or the Universal Serial Bus (USB) standard. In some other embodiments, functions of the transceiver 216 may be split into two or more separate components, or integrated with the processor 212.

The control system 220 may include one or more electronic speed controls, power supplies, navigation systems and/or payload engagement controllers for controlling the operation of the aerial vehicle 210 and for engaging with or releasing items, as desired. For example, the control system 220 may be configured to cause or control the operation of one or more of the motors 222, e.g., to cause one or more of the motors 222 to operate at desired speeds, in order to guide the aerial vehicle 210 along a desired course, at a desired speed, or at a desired altitude, as appropriate. The control system 220 may further control any other aspects of the aerial vehicle 210, including but not limited to the operation of one or more steering or braking systems of a ground vehicle, or one or more control surfaces such as wings, rudders, flaperons, elevons, elevators, ailerons, flaps, brakes or slats of an aerial vehicle, within desired ranges. In some embodiments, the control system 220 may be integrated with one or more of the processor 212, the memory 214 and/or the transceiver 216.

The motors 222 may be any type or form of motor (e.g., electric, gasoline-powered or any other type of motor) capable of generating sufficient rotational speeds of one or more propellers or other components to provide thrust and/or lift forces to the aerial vehicle 210 and any payload engaged thereby. In some embodiments, one or more of the motors 222 may be a brushless direct current ("DC") multi-phase motor such as an outrunner brushless motor or an inrunner brushless motor.

The aerial vehicle 210 may include any number of such motors 222 of any kind. For example, one or more of the motors 222 may be aligned or configured to operate with different capacities or ratings, or at different speeds, or coupled to any number of propellers having different sizes and shapes. Additionally, one or more of the motors 222 may be an electric motor, e.g., a brushless DC multi-phase motor, and one or more of the motors 222 may be a gasoline-powered motor.

The aerial vehicle 210 may also include any number of sensors 230 or other components or other features for capturing data within a vicinity of the aerial vehicle 210, including but not limited to one or more imaging devices (e.g., digital cameras), range sensors (e.g., LIDAR sensors, time-of-flight sensors, ultrasonic sensors, or others), radiofrequency transceivers or receivers, Global Positioning System ("GPS") receivers or sensors, compasses, speedometers, altimeters, thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), attitude sensors, depth gauges, accelerometers, or sound sensors (e.g., microphones, piezoelectric sensors, vibration sensors or other transducers for detecting and recording acoustic energy from one or more directions). For example, in some implementations, the aerial vehicle 210 may include two or more of such sensors 230 in an IMU or any other system. Furthermore, in some implementations, one or more of the sensors 230 may have fields of view or other orientations or configurations that enable the aerial vehicle 210 to capture information or data from below the aerial vehicle 210, or in any other direction with respect to the aerial vehicle 210. For example, in some implementations, the aerial vehicle 210 may include one or more cameras that are aligned to capture imaging data from fields of view extending below the aerial vehicle 210, and along or parallel to a yaw axis of the aerial vehicle 210. Alternatively, the aerial vehicle 210 may include one or more cameras that are aligned to capture imaging data from fields of view extending laterally with respect to the aerial vehicle 210, e.g., perpendicular to a yaw axis of the aerial vehicle 210, or along or parallel to a pitch axis or a roll axis of the aerial vehicle 210.

Although the block diagram of FIG. 2 includes a single box corresponding to a motor 222 and a single box corresponding to a sensor 230, those of ordinary skill in the pertinent arts will recognize that the aerial vehicle 210 may include any number of motors 222 or sensors 230 in accordance with the present disclosure.

The docking station 260 may be any device or system configured to receive portions of the aerial vehicle 210 therein or thereon, e.g., prior to or following operations of the aerial vehicle 210, and to support weight of the aerial vehicle 210, or provide power or connectivity to the aerial vehicle 210. The docking station 260 may include frames or housings formed from any suitable materials, as well as contacts (or connectors, e.g., charging contacts or charging connectors) for transferring power or data to or from the aerial vehicle 210. The docking station 260 may be formed from any suitable materials, and may have sizes, shapes or dimensions that are selected based on attributes or features of the aerial vehicle 210, in accordance with any of the implementations described herein.

In some implementations, the docking station 260 may include one or more transceivers or other components or systems for enabling communication between the aerial vehicle 210, the data processing system 280 or any other systems (not shown). Alternatively, in some other implementations, the docking station 260 need not include any such components or systems.

The data processing system 280 includes one or more physical computer servers 282 having one or more computer processors, one or more data stores (e.g., databases) 284, and any number of transceivers 286 associated therewith, as well as provided for any specific or general purpose. In some embodiments, the data processing system 280 of FIG. 2 may be independently provided for the exclusive purpose of receiving, analyzing or storing information or data received from the aerial vehicle 210 or, alternatively, provided in connection with one or more physical or virtual services configured to receive, analyze or store such information or data, as well as one or more other functions. In some other embodiments, the data processing system 280 may be associated with an electronic marketplace, a fulfillment center, a warehouse, a bricks-and-mortar retail establishment, or any other like facilities. Such facilities may be adapted to receive, store, process and/or distribute items, and may include any number of stations for receiving, storing and distributing items to customers, including but not limited to one or more receiving stations, storage areas and/or distribution stations, which may further include any number of associated servers, data stores, processors or like computer components. Alternatively, or additionally, in some embodiments, the data processing system 280 may be associated with any number of public or private authorities, such as police, fire or security personnel.

The servers 282 may be connected to or otherwise communicate with the data stores 284 and the transceivers 286, and may receive, analyze or store any type of information or data, e.g., imaging data, acoustic signals, environmental conditions, operational characteristics, or positions, or any other information or data, for any purpose. The servers 282 and/or the data stores 284 may also connect to or otherwise communicate with the network 290, through the sending and receiving of digital data. In some embodiments, the data processing system 280 may be provided in a physical location. In other such embodiments, the data processing system 280 may be provided in one or more alternate or virtual locations, e.g., in a "cloud"-based environment. In still other embodiments, the data processing system 280 may be provided onboard one or more vehicles, including but not limited to the aerial vehicle 210.

Each of the transceivers 216, 286 or other communications devices, systems or components may be configured to communicate through one or more wired or wireless means, e.g., wired technologies such as Universal Serial Bus (or "USB") or fiber optic cable, or wireless standards or protocols such as Bluetooth or any Wi-Fi protocol, over the network 290 or directly. The transceivers 216, 286 may further include or be in communication with one or more I/O interfaces, network interfaces or devices, and may be configured to allow information or data to be exchanged between one another, or to or from one or more other computer devices or systems via the network 290.

The transceivers 216, 286 may perform any necessary protocol, timing or other data transformations in order to convert data signals from a first format suitable for use by one component into a second format suitable for use by another component. For example, in some embodiments, the transceivers 216, 286 may be configured to communicate according to one or more protocols traditionally associated with discrete components, e.g., within specific frequency spectra, including but not limited to radio frequency signals typically within ranges of approximately three hundred to four hundred megahertz, or MHz, as well as radio frequency signals typically within ranges of approximately three hundred to five hundred megahertz, or MHZ.

In some embodiments, the transceivers 216, 286 may be configured to transmit or receive Bluetooth signals sent within an industrial, scientific and medical (ISM) radio frequency range of approximately 2.400 to approximately 2.500 gigahertz (GHz), with a center frequency of approximately 2.450 GHz. Such signals are typically sent within a particular range of approximately 2.402 to approximately 2.480 GHz, and have a maximum transmission rate on Bluetooth networks of 3 megabits per second (or 3 Mbps) or more, with a maximum transmission range of 10 to 100 meters or more, and at powers of approximately one milliwatt (mW), or 0.001 watts (W). The transceivers 216, 286 may operate according to a frequency-hopping spread spectrum (FHSS) method, e.g., by switching carriers across multiple frequency channels and transmitting communications in small segments, and in respective time slots. In some embodiments, such communications may be transmitted at approximately 1,600 times per second across 79 different subfrequencies at bandwidths of 0.001 GHZ, or one megahertz (MHz) across the 2.402 to 2.480 GHz range.

In some embodiments, the transceivers 216, 286 may be configured to transmit or receive Ultra-Wide Band (or "UWB") signals over one or more broad spectrums within any radio frequency range. In some embodiments, the UWB signals may be transmitted and/or received over a range of approximately three to eleven gigahertz (GHz), or over a range of approximately four to six gigahertz (GHz), with a center frequency of approximately five gigahertz (GHz). Alternatively, the UWB signals may be transmitted over any frequency range, and with any center frequency. Additionally, the UWB signals may consist of billions of pluses transmitted across such frequency spectrums, and at various power levels or power densities.

In some embodiments, the transceivers 216, 286 may be configured to transmit or receive RFID signals at low frequency (LF), medium frequency (MF) or high frequency (HF) levels (e.g., approximately 3 kilohertz to 30 megahertz, or 3 kHz-30 MHz) and transfer relatively small-sized sets or packets of data over short ranges (e.g., between one and one hundred centimeters, or 1-100 cm). In some other embodiments, the transceivers 216, 286 may be configured to transmit or receive RFID signals at higher frequency levels, such as ultrahigh frequency (UHF) or microwave levels (e.g., approximately 300 megahertz to 300 gigahertz, or 300 MHz-300 GHz) including larger sets or packets of data at ranges of one meter (1 m) or longer.

Alternatively, the transceivers 216, 286 may be configured to communicate within customized frequency spectra, or at dynamic frequencies, in accordance with the present disclosure. For example, in some embodiments, one or more of the transceivers 216, 286 may be configured to communicate according to a proprietary standard or protocol, or within a proprietary frequency spectrum.

In some embodiments, the transceivers 216, 286 may include support for devices attached through various types of peripheral buses, e.g., variants of the Peripheral Component Interconnect (PCI) bus standard or the Universal Serial Bus (USB) standard. In some other embodiments, functions of the transceivers 216, 286 may be split into two or more separate components, or incorporated directly into one or more processors or other components.

The network 290 may be any wired network, wireless network, or combination thereof, and may comprise the Internet in whole or in part. In addition, the network 290 may be a personal area network, local area network, wide area network, cable network, satellite network, cellular telephone network, or combination thereof. The network 290 may also be a publicly accessible network of linked networks, possibly operated by various distinct parties, such as the Internet. In some embodiments, the network 290 may be a private or semi-private network, such as a corporate or university intranet. The network 290 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein. Any combination of networks or communications protocols may be utilized in accordance with the systems and methods of the present disclosure. For example, the various components described herein may be configured to communicate via an open or standard protocol such as Wi-Fi. Alternatively, such components may be configured to communicate with one another directly outside of a centralized network, such as the network 290, e.g., by a wireless protocol such as Bluetooth, in which two or more of such components may be paired with one another.

The computers, servers, devices and the like described herein have the necessary electronics, software, memory, storage, databases, firmware, logic/state machines, microprocessors, communication links, displays or other visual or audio user interfaces, printing devices, and any other I/O devices to provide any of the functions or services described herein and/or achieve the results described herein. Also, those of ordinary skill in the pertinent arts will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The aerial vehicle 210, the docking station 260 and/or the data processing system 280 may use any web-enabled or Internet applications or features, or any other client-server applications or features including electronic mail (or E-mail), or other messaging techniques, to connect to the network 290 or to communicate with one another, such as through short or multimedia messaging service (SMS or MMS) text messages, social network messages, online marketplace messages, telephone calls or the like. For example, the aerial vehicle 210, the docking station 260 and/or the data processing system 280 may be adapted to transmit information or data in the form of synchronous or asynchronous messages between or among themselves, or between or among any other computer device in real time or in near-real time, or in one or more offline processes, via the network 290. Those of ordinary skill in the pertinent arts would recognize that the aerial vehicle 210, the docking station 260 and/or the data processing system 280 may operate any of a number of computing devices that are capable of communicating over the network, including but not limited to set-top boxes, personal digital assistants, digital media players, web pads, laptop computers, desktop computers, laptop computers, tablet computers, smartphones, smart speakers, wrist watches, electronic book readers, and the like. The protocols and components for providing communication between such devices are well known to those skilled in the art of computer communications and need not be described in more detail herein.

The data and/or computer-executable instructions, programs, firmware, software and the like (also referred to herein as "computer-executable" components) described herein may be stored on a computer-readable medium that is within or accessible by computers or computer components such as the processors 212 and/or the data processing system 280, or any other computers or control systems, and having sequences of instructions which, when executed by a processor (e.g., a central processing unit, or "CPU"), cause the processor to perform all or a portion of the functions, services and/or methods described herein. Such computer-executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer-executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3A:
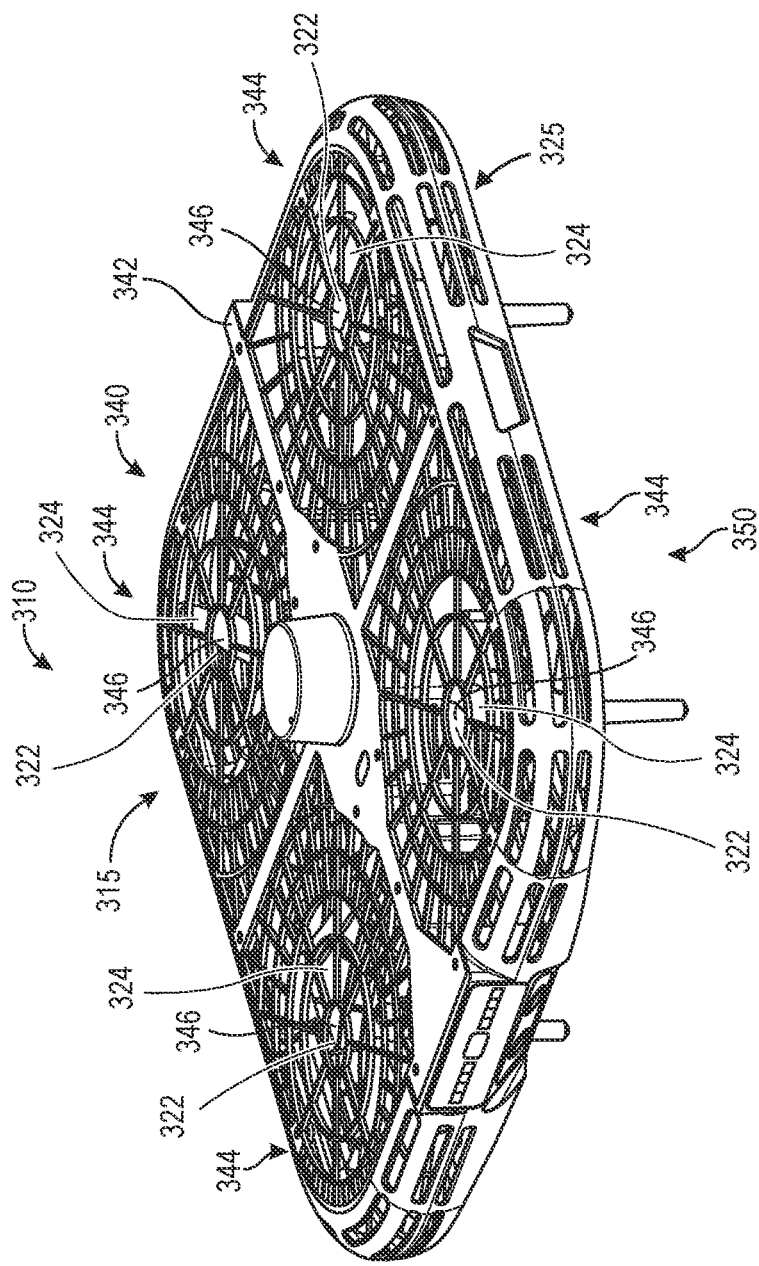
FIGS. 3A and 3B are views of aspects of one aerial vehicle in accordance with embodiments of the present disclosure.
Figure 3B:
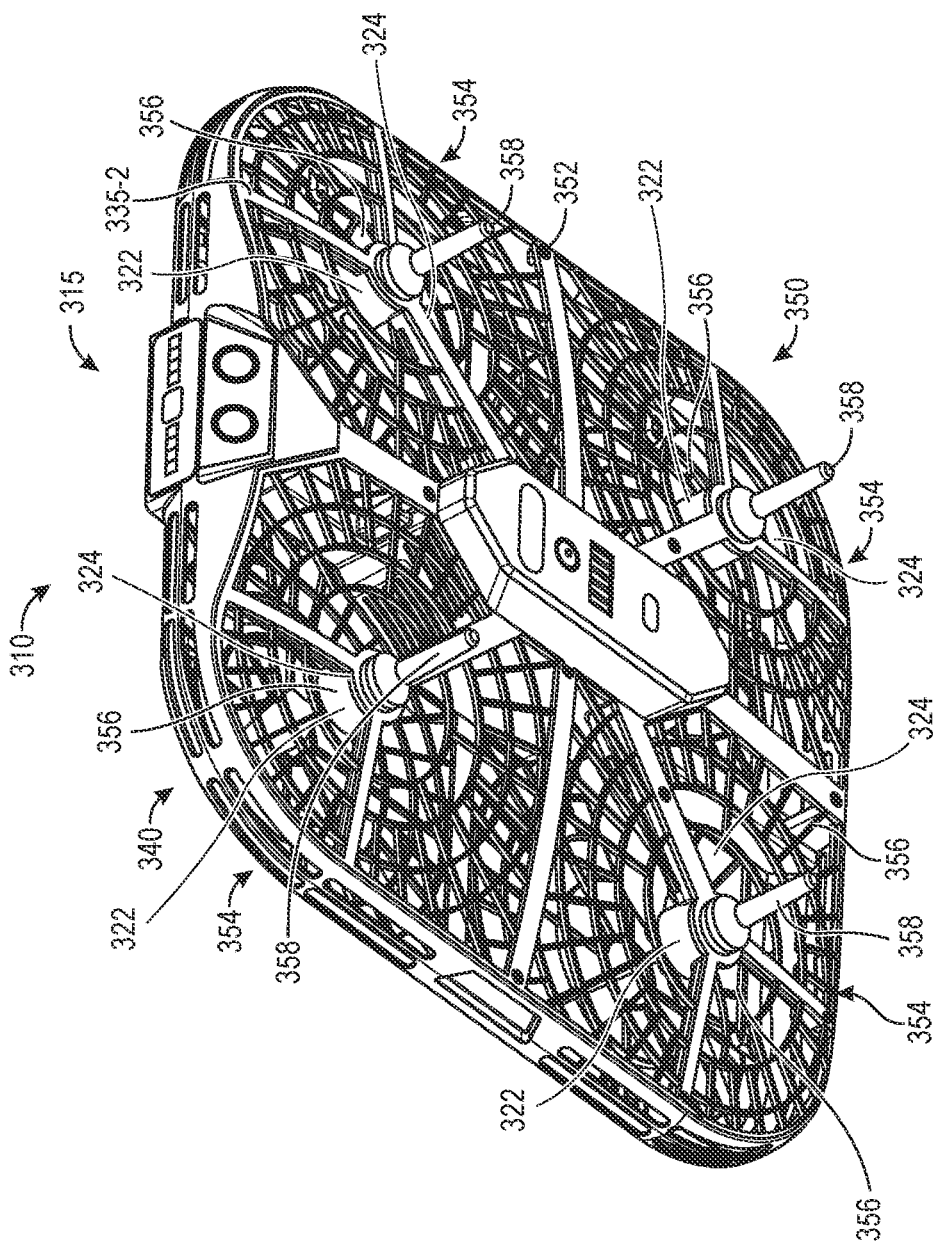

As is discussed above, housings of aerial vehicles of the present disclosure may be formed from sections having meshed or mesh-like constructions. Referring to FIGS. 3A and 3B, a view of an aerial vehicle in accordance with embodiments of the present disclosure is shown. Except where otherwise noted, reference numerals preceded by the number "3" shown in FIG. 3A or 3B refer to elements that are similar to elements having reference numerals preceded by the number "2" shown in FIG. 2 or by the number "1" shown in FIGS. 1A through 1E.

As is shown in FIGS. 3A and 3B, an aerial vehicle 310 includes a housing 315 formed from a shroud (or a side section) 325, an upper section 340, a lower section 350. As is shown in FIG. 3A, the upper section 340 includes an upper frame 342 and plurality of upper mesh sections 344. As is further shown in FIG. 3A, a representative one of the upper mesh sections 344 includes an inner ring defining a central opening 346 and a plurality of spokes extending radially outward from the central opening 346, as well as a plurality of other concentric rings having radii that are progressively larger than the central opening 346. The inner ring of the upper mesh section 344 defining the central opening 346, the spokes or the other concentric rings may have cross-sections of any other shape or size, e.g., squares, rectangles, circles or others, and may have any dimensions, such as widths or diameters of one to two millimeters (1-2 mm) each, and any lengths. Moreover, the central opening 346 and the other concentric rings may have any radii or diameters. For example, in some implementations, the central opening 346 may have a diameter of approximately one to two centimeters (1-2 cm), and the concentric rings may have progressively larger diameters, e.g., approximately nine to ten millimeters (9-10 mm) from the inner ring defining the central opening 346 or one another in a radial direction. The spokes of the upper mesh section 344 may have any angular separation from one another, e.g., forty-five degrees, or any fraction thereof, e.g., one-fourth of forty-five degrees.

As is shown in FIG. 3B, the lower section 350 also includes a lower frame 352, a plurality of lower mesh sections 354 (or lower meshes) mounted to the lower frame 352, and a plurality of landing pegs (or landing struts, or landing feet) 358. As is further shown in FIG. 3B, the lower mesh sections 354 may each be defined by a radially oriented lattice structure that includes a central opening 356 defined by an inner ring or another circular object. The lower mesh section 354 further includes a plurality of spokes extending radially outward from the central opening 356, as well as a plurality of other concentric rings having radii that are progressively larger than the central opening 356. The inner ring of the lower mesh section 354 defining the central opening 356, the spokes or the other concentric rings may have cross-sections of any other shape or size, e.g., squares, rectangles, circles or others, and may have any dimensions, such as widths or diameters of one to two millimeters each, and any lengths. Moreover, the central opening 356 and the other concentric rings may have any radii or diameters. For example, in some implementations, the central opening 356 may have a diameter of approximately two to four centimeters (2-4 cm), and the concentric rings may have progressively larger diameters, e.g., approximately nine to ten millimeters (9-10 mm) from the inner ring defining the central opening 356 or one another in a radial direction. The spokes of the upper mesh section 354 may have any angular separation from one another, e.g., forty-five degrees, or any fraction thereof, e.g., one-fourth of forty-five degrees.

As is shown in FIGS. 3A and 3B, the upper section 340 includes four upper mesh sections 344, each of which is provided above one of the propulsion motors 322. The lower section 350 includes four lower mesh sections 354, each of which is provided below one of the propulsion motors 322, and joined or otherwise mounted to the lower frame 352 or arms of a chamber to which the propulsion motors 322 are mounted. As is further shown in FIG. 3A, when the upper mesh sections 344 are mounted to the upper frame 342, the central openings 346 of each of the upper mesh sections 344 are coaxially aligned above one of the propulsion motors 322. As is further shown in FIG. 3B, when the lower mesh sections 354 are mounted to the lower frame 352, the central openings 356 of each of the lower mesh sections 354 are coaxially aligned below one of the propulsion motors 322.

As is shown in FIGS. 3A and 3B, the inner rings defining the central openings 356 of each of the lower mesh sections 354 have diameters that are substantially larger than the inner rings defining the central openings 346 of each of the upper mesh sections 344. For example, the central opening 356 may have a diameter of approximately two to four centimeters (2-4 cm), or approximately twice a diameter of the central openings 346, and the concentric rings of the lower mesh sections 354 may have progressively larger diameters. Likewise, the lower mesh sections 354 may include an increased number of spokes or concentric rings that are closer in proximity to one another at outer portions of such sections. In some implementations, one or more concentric rings of the lower mesh sections 354 may have the same dimensions as corresponding concentric rings of the upper mesh sections 344.

As is shown in FIG. 3A, the upper mesh section 344 includes the central opening 346 aligned with an axis of rotation of a motor 322 and a propeller 324, as well as a first set of openings arranged around the central opening 346, a second set of openings arranged around the first set of openings, and other sets of openings located radially beyond the second set of openings. As is shown in FIG. 3A, a first radial distance from the axis of rotation of the motor 322 and the propeller 324 to an inner edge of the central opening 346 is less than a second radial distance from an outer edge of the central opening 346 to an inner edge of the first set of openings, and the second radial distance is greater than both a third radial distance from an outer edge of the first set of openings to an inner edge of the second set of openings and the first radial distance.

As is shown in FIG. 3B, the lower mesh section 354 includes the central opening 356 aligned with the axis of rotation of the motor 322 and the propeller 324, as well as a third set of openings arranged around the central opening 356, a fourth set of openings arranged around the third set of openings, and other sets of openings located radially beyond the fourth set of openings. As is shown in FIG. 3B, a fourth radial distance from the axis of rotation of the motor 322 and the propeller 324 to an inner edge of the central opening 356 is greater than both a fifth radial distance from an outer edge of the central opening 356 to an inner edge of the third set of openings and a sixth radial distance from an outer edge of the third set of openings to an inner edge of the fourth set of openings.

The construction of the upper mesh sections 344 and the lower mesh sections 354 may result in improved operation of the motors 322 while enhancing the safety of the aerial vehicle 310. For example, distances between the central openings 346 of the upper mesh sections 344 or the central openings 356 of the lower mesh sections 354 and the concentric rings arranged around them, may be selected to facilitate airflow proximate the hubs of the propellers 324, as compared to airflow proximate to tips or outer edges of the propellers 324. In some implementations, the larger central openings 356 of the lower mesh sections 354 result in enhanced airflow distribution across propellers 324 near their respective hubs.

Further, in some implementations, a density of spokes and concentric rings at outer portions of the lower mesh sections 354 that are provided below tips of the propellers 324 may be greater than a density of spokes and concentric rings at outer portions of the upper mesh sections 344 that are provided above tips of the propellers 324. For example, a number of spokes between outermost concentric rings and next-outermost concentric rings of the lower mesh section 354 may be greater than not only a number of spokes between the inner ring defining the central opening 356 and a first concentric ring of the lower mesh section 354 but also greater than a number of spokes between outermost concentric rings and next-outermost concentric rings of the upper mesh section 344. The greater density of spokes and concentric rings at outer portions of the lower mesh sections 354 may inhibit the unwanted or unintended insertion of fingers or other body parts or objects into the housings 315 through such openings, thereby preventing damage to the motors 322 or the propellers 324, or reducing a risk of injury. Conversely, the distribution and spacing of the spokes and the concentric rings about the central openings 346 of the upper mesh sections 344 may be more regular and consistent throughout the respective upper mesh sections 344.

Moreover, the propellers 324 may be formed from a single-piece construction, and with rigid blades of fixed dimensions, or, alternatively, may have a foldable construction defined by one or more hinges, such that the propeller 324 may be folded into a reduced length or size when not rotating under power, and may be extended to a full length or size when operating under power. Furthermore, where the propeller 324 has a foldable construction, e.g., with blades having one or more hinges, in the event that an object contacts the propeller 324 during operation, the propeller 324 may deflect or fold in response to contact with the object. Such hinges may be provided at or near a hub of the propeller 324, or at any other location along the blades of the propeller 324.

The inner rings defining the central openings 346, 356, as well as the spokes and the concentric rings may have cross-sections of any shape or size, e.g., squares, rectangles, circles or others, and may have any dimensions, such as widths or diameters of one to one-and-one-half millimeters (1-1.5 mm) each, or any other dimensions, and any lengths. Moreover, the central openings 346, 356 and the other concentric rings may have any radii or diameters. Furthermore, the spaces between the respective spokes or concentric rings of the upper mesh sections 344 or the lower mesh sections 354 may be selected on any basis, such as economy, weight, safety or other factors.

As is further shown in FIG. 3B, the substantially slender construction of the landing pegs 358 serves to limit an extent to which the landing pegs 358 may inhibit airflow distribution across the propellers 324. For example, because proximal ends of each of the landing pegs 358 are mounted directly below one of the respective motors 322, e.g., to a support member of the lower frame 352, and because the landing pegs 358 neck or narrow from the proximal end to the distal ends of the landing pegs 358, the landing pegs 358 remain clear of areas through which air flows prior to entering the housing 315 through the respective lower mesh sections 354.

Figure 4:
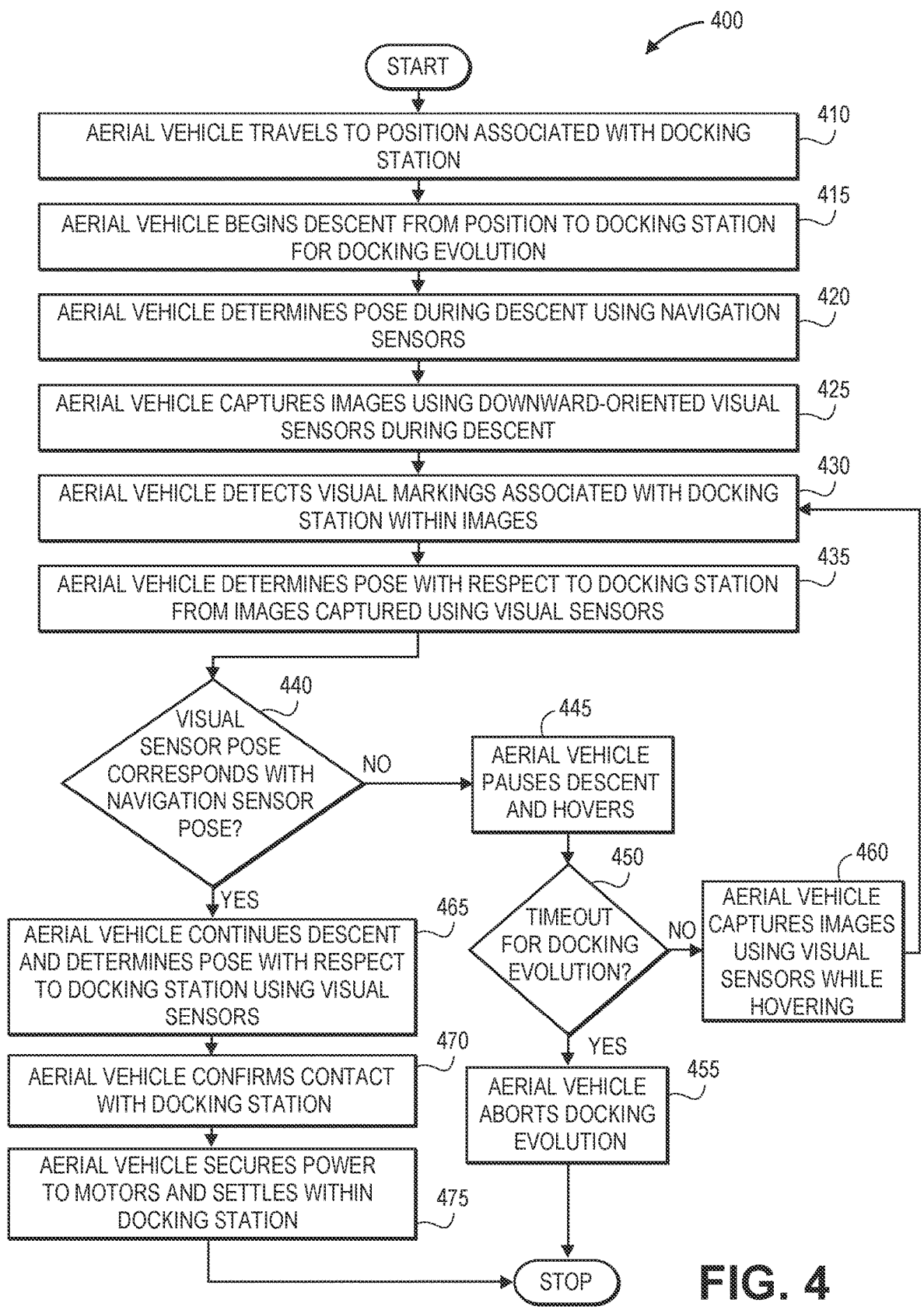
FIG. 4 is a flow chart of one process to be performed by an aerial vehicle in accordance with embodiments of the present disclosure.

Referring to FIG. 4, a flow chart 400 of one process to be performed by an aerial vehicle in accordance with embodiments of the present disclosure is shown.

At box 410, an aerial vehicle travels to a position associated with a docking station. For example, the aerial vehicle may engage in flight operations of any type or form, and may be programmed or otherwise configured to operate one or more propulsion motors and cause the aerial vehicle to travel on one or more trajectories in order to arrive at the position, which may be provided at any height or altitude above the docking station. In some implementations, the position may be selected based on a last-known position of the docking station, as well as any offsets or buffers between the docking station and any walls or other structural features.

At box 415, the aerial vehicle begins a descent from the position to the docking station. For example, the aerial vehicle may operate one or more propulsion motors to reduce an amount of lift supplied to the aerial vehicle, thereby causing the aerial vehicle to reduce its altitude with respect to the docking station. The aerial vehicle may further conduct any additional desired operations to reorient or reposition the aerial vehicle along or about a yaw axis, a pitch axis or a roll axis during the descent, as necessary.

At box 420, the aerial vehicle determines a pose during the descent using one or more navigation sensors. In some implementations, the aerial vehicle may utilize any data captured by any number of sensors, e.g., according to any SLAM techniques or any other techniques, to determine a position and orientation of the aerial vehicle in 3D space.

At box 425, the aerial vehicle captures images using one or more downward-oriented visual sensors during the descent. For example, the aerial vehicle may include any number of cameras or other sensors that are aligned to capture data along or parallel to a yaw axis of the aerial vehicle, and from fields of view extending below the aerial vehicle. Alternatively, the aerial vehicle may capture data from below the aerial vehicle using any type or form of sensor. For example, the aerial vehicle may include any number of radiofrequency receivers or transceivers that are configured or aligned to capture transmissions of radiofrequency signals originating from below the aerial vehicle, or from any other direction with respect to the aerial vehicle.

At box 430, the aerial vehicle detects one or more visual markings associated with the docking station within the images. One or more of the visual markings may be letter, symbol, icon or other indicator that may be detected within images captured by a camera of the aerial vehicle. Alternatively, one or more of the visual markings may be any sources of light, e.g., light-emitting diodes, or "LED," that may emit light to be detected within images captured by a camera of the aerial vehicle. One or more of the visual markings may also be a reflective surface or feature that may reflect light to be detected within images captured by a camera of the aerial vehicle. Such surfaces or features may be retroreflective in nature, or may have any other reflective properties.

The aerial vehicle may be programmed with information or data regarding a known orientation or arrangement of the visual markings within a depression, a cavity or another portion or surface of the docking station. The aerial vehicle may be further programmed with one or more sets of instructions for performing any number of detection or recognition algorithms or techniques on images captured by the visual sensors. Alternatively, the aerial vehicle may detect portions of a docking station from data captured using sensors of any other type or form. For example, where the aerial vehicle is equipped with radiofrequency receivers or transceivers that are configured or aligned to capture transmissions of radiofrequency signals originating from below the aerial vehicle, or from any other direction with respect to the aerial vehicle, and the docking station is equipped with transmitters or transceivers provided on discrete portions of the docking station that are configured to transmit radiofrequency signals therefrom, the aerial vehicle may capture signals transmitted by the docking station and determine distances to such portions based on such signals.

At box 435, the aerial vehicle determines a pose with respect to the docking station during the descent based on the markings detected within the images captured using the visual sensors. Upon detecting the visual markings, the aerial vehicle may determine its position and orientation with respect to the docking station, and may further compare the position and orientation determined with respect to the docking station to the position and orientation determined at box 430 with respect to 3D space. Alternatively, the aerial vehicle may determine a pose with respect to the docking station in any other manner based on data captured by sensors of the aerial vehicle.

At box 440, whether the visual sensor pose determined at box 435 corresponds to the navigation sensor pose determined at box 420 is determined. If the pose determined using the visual sensors does not correspond to the pose determined using the navigation sensors, then the process advances to box 445, where the aerial vehicle pauses its descent and hovers. At box 450, whether a timeout for the docking evolution has been reached is determined. If a timeout has been reached, then the process advances to box 455, where the aerial vehicle aborts the docking evolution. For example, the aerial vehicle may ascend to the original position above the docking station and attempt another docking evolution. Alternatively, the aerial vehicle may travel to an alternate or different location and attempt to land on one or more surfaces there, or to complete a docking evolution at a different docking station.

If a timeout has not been reached, however, then the process advances to box 460, where the aerial vehicle continues to capture images using the visual sensors while hovering.

If the visual sensor pose determined at box 435, e.g., based on images captured while descending or hovering, matches the navigation sensor pose determined at box 420, then the process advances to box 465, where aerial vehicle continues to descend toward the docking station, and determines its pose with respect to the docking station using information or data captured using the visual sensors. For example, the aerial vehicle may track its position during a descent according to one or more visual servoing or visual-inertial servoing techniques, based on images captured using downward-oriented visual sensors alone, and without reliance on any navigation sensors. The aerial vehicle may conduct any additional desired operations to reorient or reposition the aerial vehicle along or about a yaw axis, a pitch axis or a roll axis during the descent, as necessary.

At box 470, the aerial vehicle confirms contact with the docking station.

At box 475, the aerial vehicle secures power to its motors and settles within the docking station, and the process ends.

As is discussed above, docking stations (e.g., docks), such as base components, charging docks (or charging stations or docking stations), or other intermediary devices, may define depressions, cavities or other openings having sloped surfaces and receptacles (or recesses or other openings) that are oriented or aligned to correspond to landing extensions of aerial vehicles, such that ends of the landing extensions may be guided into such receptacles when the aerial vehicles conduct docking evolutions at the docking stations. Referring to FIGS. 5A through 5D, views of aspects of one system in accordance with embodiments of the present disclosure are shown. Except where otherwise noted, reference numerals preceded by the number "5" shown in FIGS. 5A through 5D refer to elements that are similar to elements having reference numerals preceded by the number "3" shown in FIG. 3A or 3B, by the number "2" shown in FIG. 2, or by the number "1" shown in FIGS. 1A through 1E.

Figure 5A:
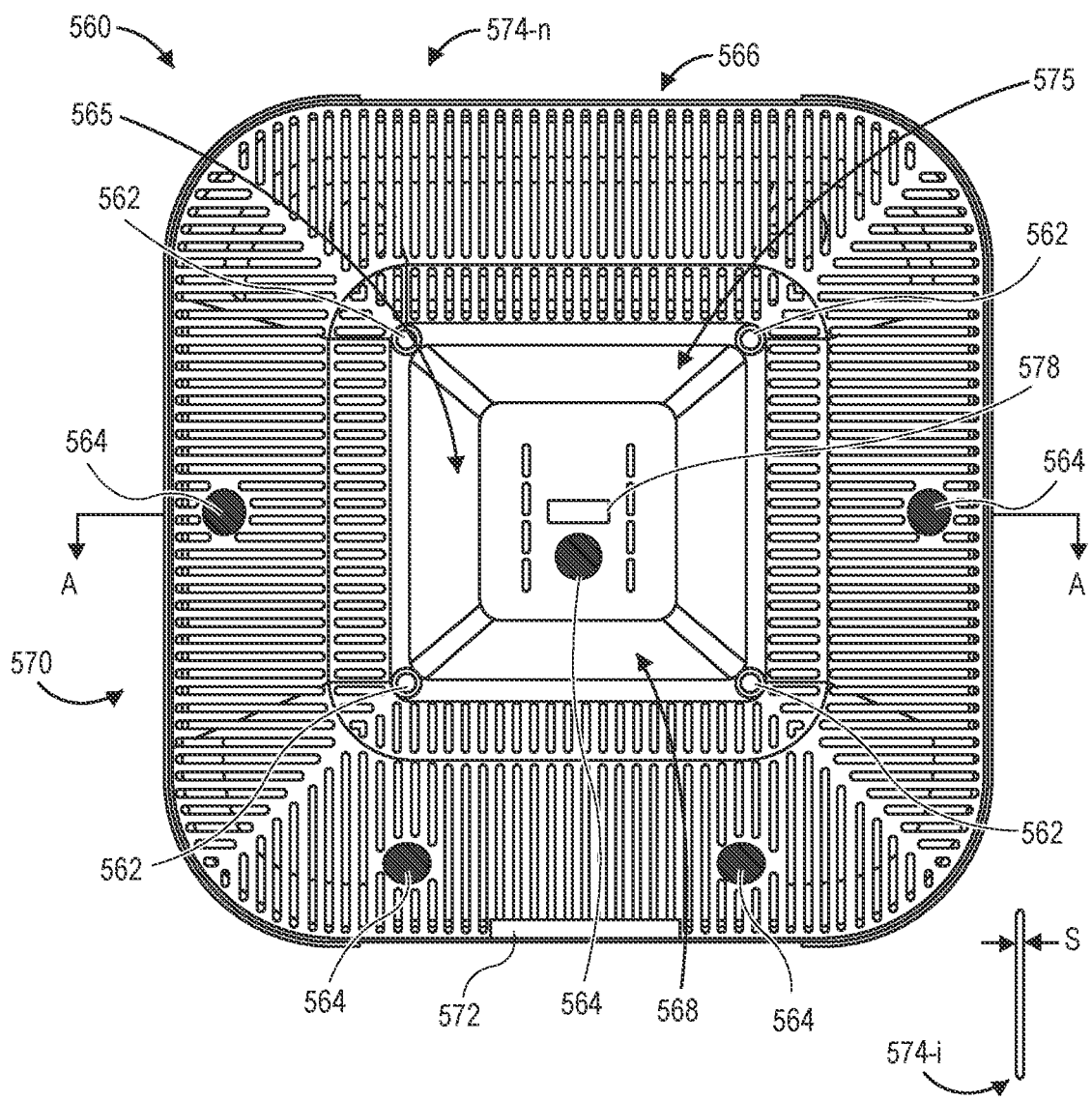
FIGS. 5A through 5D are views of aspects of one system in accordance with implementations of the present disclosure.
Figure 5A:
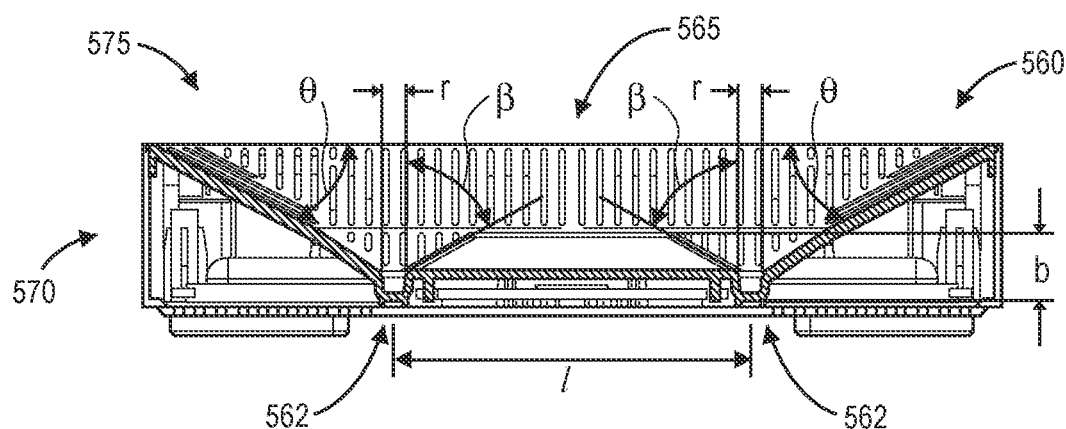

FIG. 5A includes a top view of a docking station 560 and a sectional view of the docking station 560, along the section lines A-A. As is shown in FIGS. 5A, the docking station 560 includes a frame 565 defining a depression or other cavity for accommodating portions of an aerial vehicle therein and a housing 570. The docking station 560 has a cross-section having a shape of a rounded square, or squircle, with angled edge surfaces 566 descending from edges of the frame 565 at an angle θ into the depression or cavity to a bottom section 568. The housing 570 includes a substantially flat base and a plurality of walls extending normal to the base. The walls of the housing 570 define an upper rim that mates with or contacts an upper edge of the frame 565. The housing 570 further includes a raised extension (or privacy cover or privacy member) 572 from one of the walls of the housing 570 that extends above the upper edge of the frame 565. The raised extension 572 is sized, shaped and provided in a location that may be selected to obscure a lens or another optical component of an aerial vehicle, when the aerial vehicle is docked in the docking station 560.

As is further shown in FIG. 5A, the frame 565 of the docking station 560 also includes a plurality of receptacles (or recesses or other openings) 562 that are sized and aligned to accommodate landing pegs, landing struts, landing feet or other appurtenances or extensions of an aerial vehicle therein. For example, as is shown in FIG. 5A, the receptacles 562 are arranged at corners of a square or another rectangle on the bottom section 568 of the frame 565. Alternatively, the receptacles 562 may be arranged in any shape other than a rectangle.

The receptacles 562 each have a diameter or width r that may be selected to accommodate landing pegs, landing struts, landing feet or other portions of a landing extension of an aerial vehicle therein, and centers of adjacent receptacles 562 are separated by distances l. The bottom section 568 of the frame 565 also includes a central portion that is raised above the receptacles 562, e.g., at a height b above the receptacles 562, and provided at an angle β with respect to the receptacles 562.

The frame 565 also includes a plurality of visual markings 564 that may be detected within imaging data captured by one or more cameras of an aerial vehicle, as the aerial vehicle descends toward the docking station 560. For example, the visual markings 564 may include any number of reflective surfaces (e.g., retroreflectors) or other objects that may be detected within imaging data captured by such cameras. The angled sections 566 of the frame 565 further include a plurality of openings 574-n (e.g., slit openings) that enable downward airflow from an aerial vehicle taking off, landing on or into, or otherwise hovering over the frame 565 to pass through the frame 565 and discharge laterally outwardly therefrom. As is shown in FIG. 5A, each of the openings 574-n provided in one of the angled sections 566 is oriented such that a lengthwise direction of each of the openings 574-n is aligned in a direction of a slope of the angled section 566 in which the openings 574-n are provided. The openings 574-n may also provide ventilation for any electronic components provided within the frame 565, e.g., power or communications systems for providing electrical power or data to aerial vehicles. A representative opening 574-i of the openings 574-n has a width s.

The bottom section 568 of the frame 565 may also include one or more contacts (or connectors, e.g., charging contacts or charging connectors) 578 or other features (not shown) for mating with corresponding contacts (or connectors, e.g., charging contacts or charging connectors) of an aerial vehicle, such as one or more contacts provided on an underside or other portion of the aerial vehicle that is inserted into or enters the cavity defined by the frame 565. Such contacts enable electrical power, information or data to be conveyed between the aerial vehicle and the docking station 560.

Figure 5B:
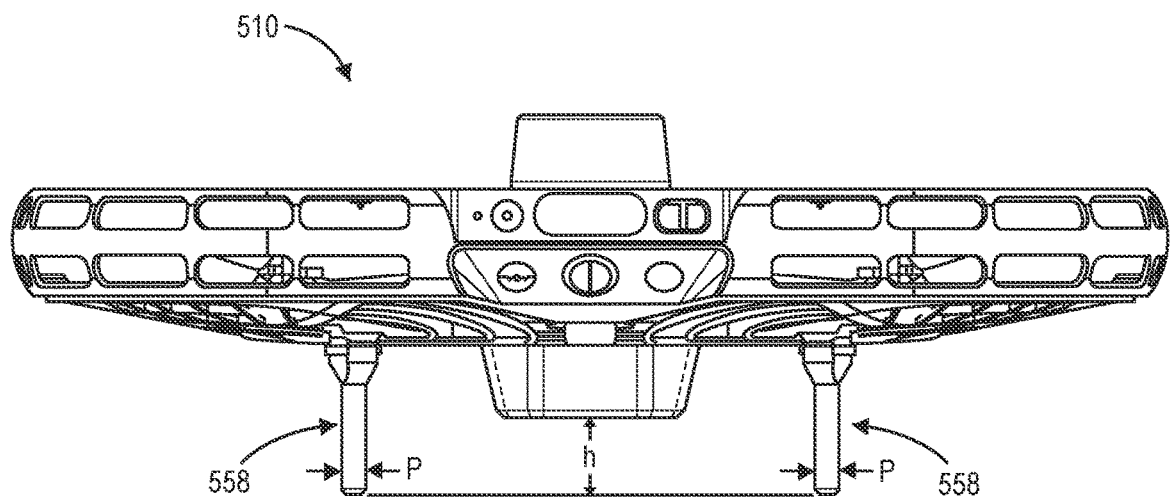
Figure 5B:
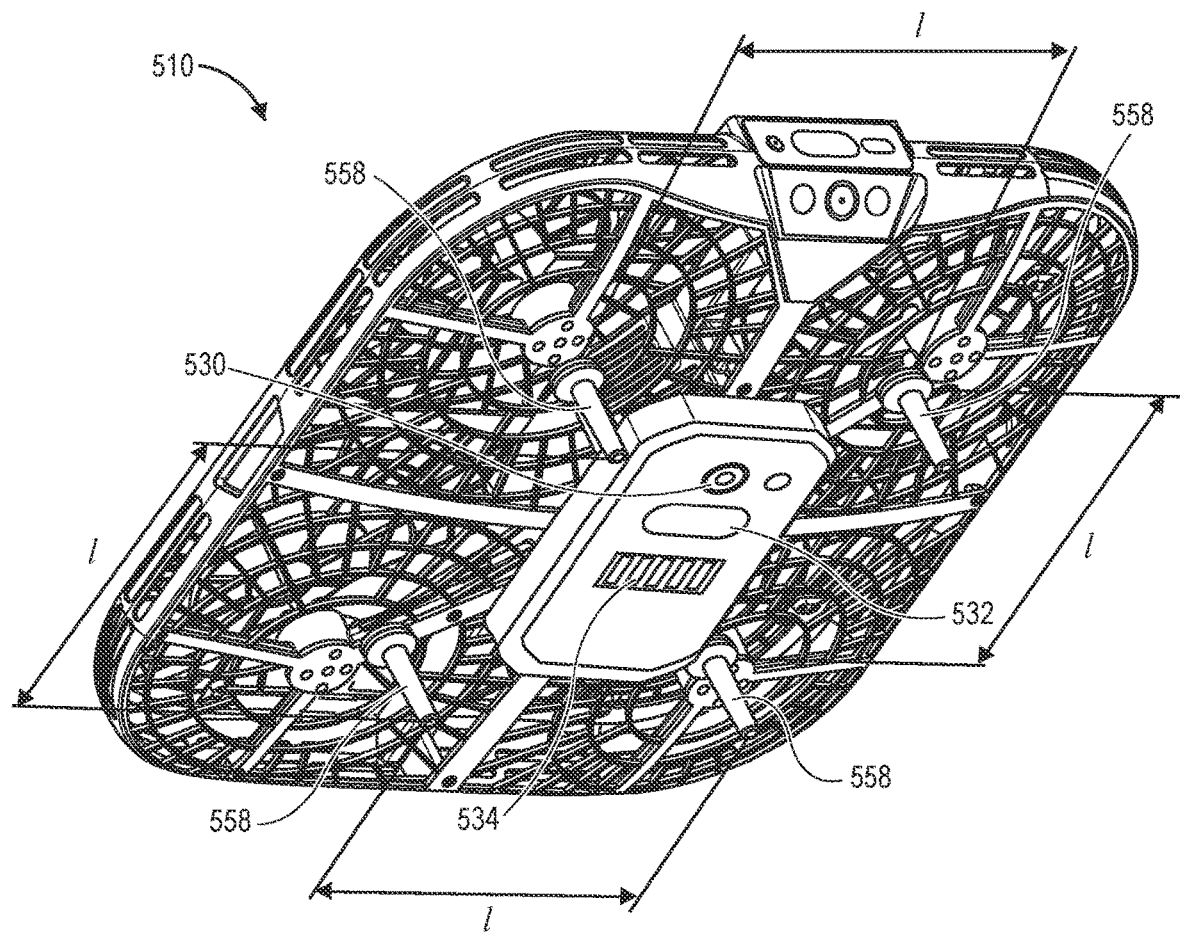

FIG. 5B shows a side view of an aerial vehicle 510 and a perspective view of an underside of the aerial vehicle 510. As is shown in FIG. 5B, the aerial vehicle 510 includes a camera 530 provided in association with a chamber descending below a housing of the aerial vehicle 510, one or more illuminators (or light sources) 532 for projecting light below the aerial vehicle 510, and one or more charging contacts 534 for mating with the contacts 578 of the frame 565. The aerial vehicle 510 further includes a plurality of landing pegs (or landing struts, or landing feet) 558, which extend below the underside of the aerial vehicle 510 and are provided in a predetermined arrangement corresponding to an arrangement of the receptacles 562, e.g., in a shape of a square or another rectangle. For example, each of the landing pegs 558 has a diameter p and is mounted to an underside of the aerial vehicle 510 in predetermined positions or provided at the distances/from one another, corresponding to the distances/between adjacent receptacles 562 within the docking station 560 shown in FIG. 5A. Moreover, each of the landing pegs 558 extends at a distance h below the underside of the aerial vehicle 560. Each of the receptacles 562 may be further sized or shaped to accommodate one of the landing pegs 558 therein, such that the diameters r of the receptacles are not less than the diameters p of the landing pegs 558. Moreover, materials from which the angled edge sections 566 and the bottom section 568 are formed may be selected based on their respective properties of friction, e.g., to maximize sliding of the landing pegs 558 with respect to the frame 565 when the landing pegs 558 are not in the receptacles 562.

As is further shown in FIG. 5B, the frame 565 of the docking station 560 may further include a set of feet or extensions that raise a lower surface of the frame 565 above a surface upon which the docking station 560 rests, thereby enabling any downward airflow that entered the frame 565 from above to pass through the frame 565 and discharge laterally outwardly therefrom.

Figure 5C:
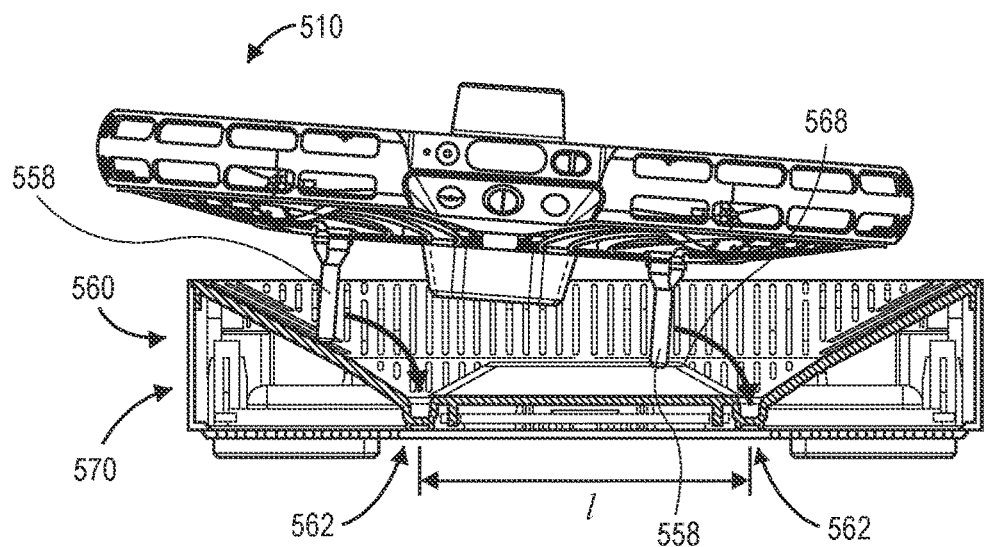
Figure 5C:
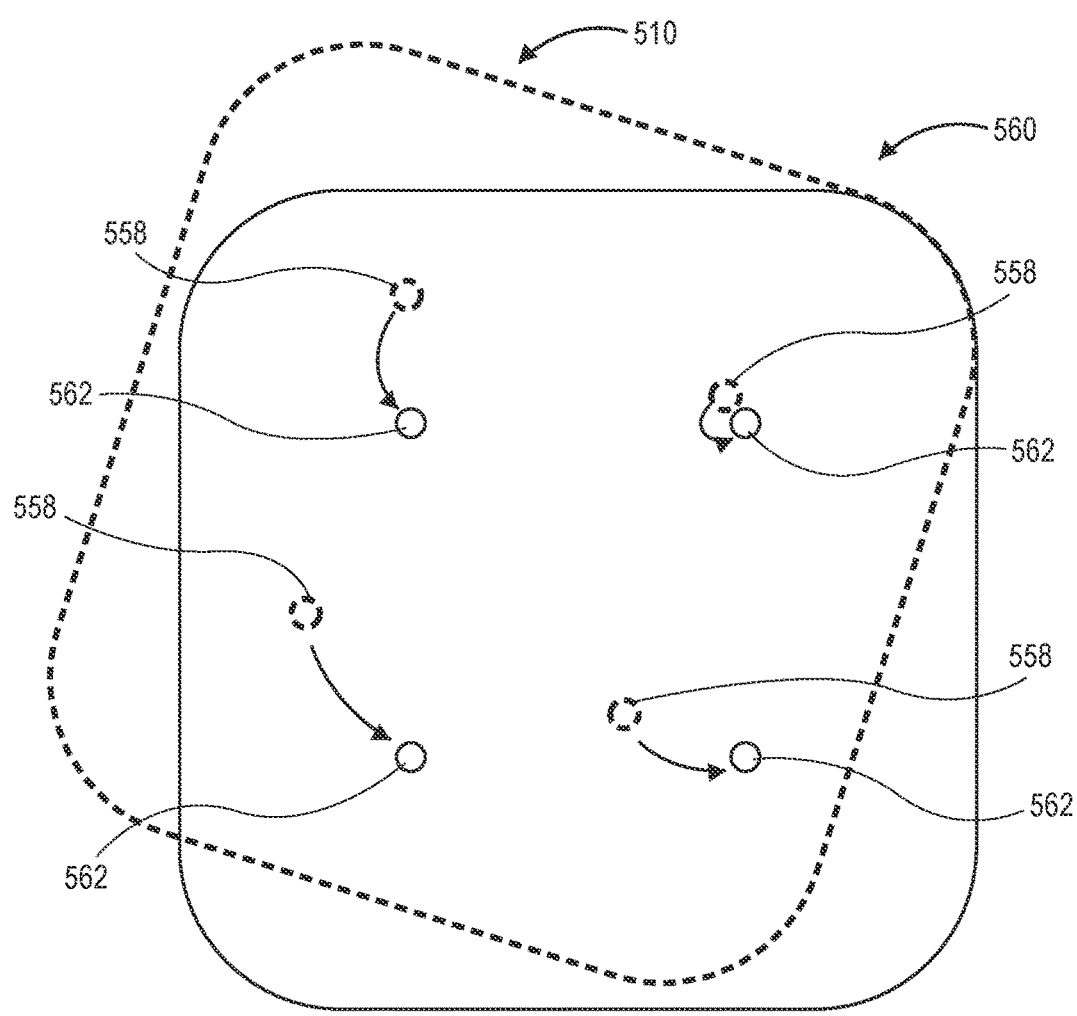

As is shown in FIG. 5C, when the aerial vehicle 510 attempts to perform a docking evolution at the docking station 560, and the aerial vehicle 510 is not properly aligned with the frame 565 of the docking station 560, the landing pegs 558 of the aerial vehicle 510 do not immediately enter the receptacles 562, and instead come into contact with one or more of the angled edge surfaces 566 of the frame 565, or the angled portions of the bottom section 568.

Figure 5D:
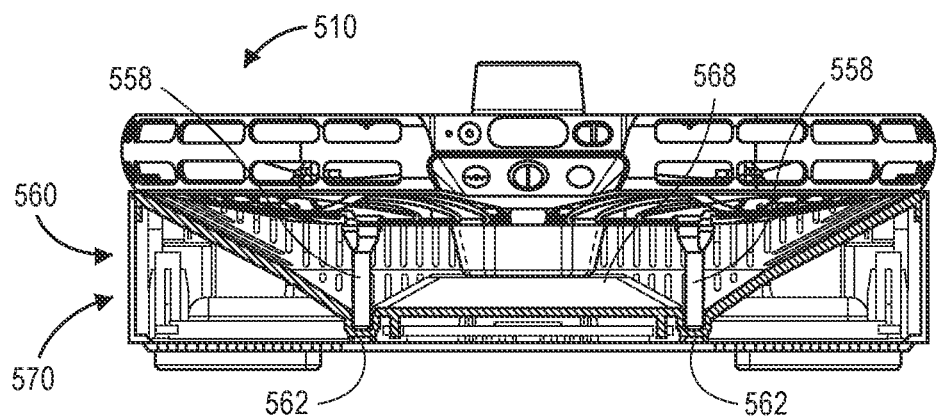
Figure 5D:
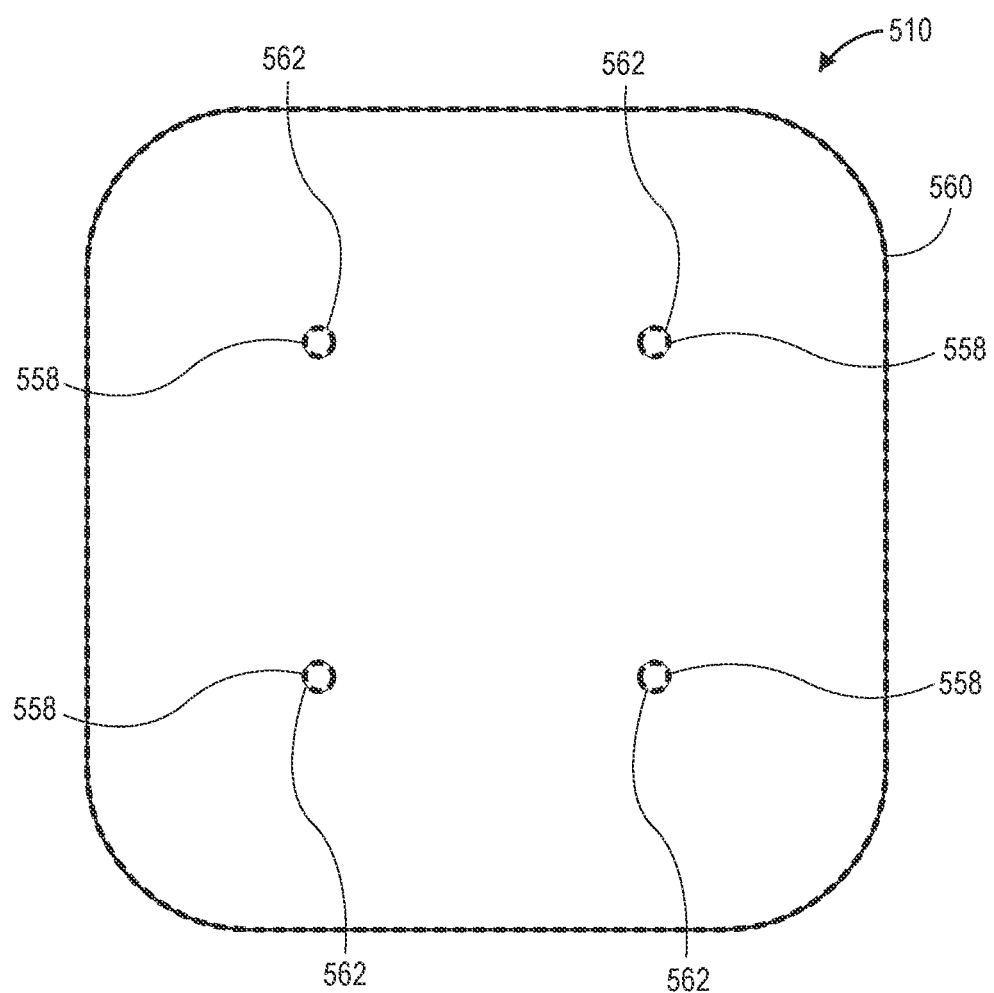

Because the edge surfaces 566 and the bottom section 568 are provided at the angles β, θ, the aerial vehicle 510 may begin to slide within the frame 565, with the landing pegs 558 and the frame 565 experiencing sufficiently low friction. The aerial vehicle 510 rotates and translates with respect to the frame 565 as the landing pegs 558 move along the edge surfaces 566 and the bottom section 568 toward the receptacles 562. As is shown in FIG. 5D, after the landing pegs 558 have slid into the receptacles 562, the aerial vehicle 510 is docked in the docking station 560, and the charging contacts 534 are placed into contact with the contacts 578 of the docking station 560.

In accordance with one or more implementations, an unmanned aerial vehicle, or drone, may include landing feet, and a dock includes receptacles, recesses or other openings that are configured to receive the landing feet. The dock may further include sloped surfaces that are provided and aligned to facilitate sliding of the landing feet across the sloped surfaces during landing in a manner that directs the landing feet toward the recesses. The sloped surfaces may also include openings defined therethrough to facilitate smooth sliding while minimizing backdraft from air propelled downward by rotors of the drone during landing. The dock may also include sources of light, e.g., light-emitting diodes, or "LED," or reflectors of light, e.g., retroreflectors, that are arranged in an asymmetric pattern and may be detected within images captured by the unmanned aerial vehicle to facilitate orientation of the drone during landing. The dock includes a charging connector, and a privacy cover that is aligned to cover a camera of the unmanned aerial vehicle while it is received within the dock.

The contents of U.S. patent application Ser. No. 16/584,721 are incorporated by reference herein in their entirety.

Although some embodiments of the present disclosure show the use of autonomous vehicles in support of one or more applications or functions (e.g., security applications or functions) within indoor spaces of a facility such as a home or a like structure, those of ordinary skill in the pertinent arts will realize that the systems and methods of the present disclosure are not so limited. Rather, the systems and methods of the present disclosure may be utilized in connection with any facility, including but not limited to homes, in support of any type of application or function.

Furthermore, although some of the signals or energy that are described as being transmitted or received by one or more transceivers or other sensors herein have specific labels of protocols, standards or frequency bands (e.g., Wi-Fi or Bluetooth), those of ordinary skill in the pertinent arts will recognize that signals or energy may be transmitted or received by one or more transceivers or other sensors at any frequency or at any intensity level, and according to any protocol or standard, in accordance with embodiments of the present disclosure.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, orders in which such methods or processes are presented are not intended to be construed as any limitation on the claimed inventions, and any number of the method or process steps or boxes described herein can be combined in any order and/or in parallel to implement the methods or processes described herein. Additionally, it should be appreciated that the detailed description is set forth with reference to the accompanying drawings, which are not drawn to scale. In the drawings, the use of the same or similar reference numbers in different figures indicates the same or similar items or features. Except where otherwise noted, left-most digit(s) of a reference number identify a figure in which the reference number first appears, while two right-most digits of a reference number in a figure indicate a component or a feature that is similar to components or features having reference numbers with the same two right-most digits in other figures.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A system comprising:
    a docking station, wherein the docking station comprises a housing and a frame disposed within the housing of the docking station, a plurality of receptacles and a plurality of visual markings,
        wherein the housing of the docking station has a flat base and walls extending normal to the base,
        wherein the walls define an upper rim of the housing of the docking station,
        wherein the frame defines a depression having an edge with a size and a shape corresponding to the upper rim of the housing of the docking station, a bottom section, and angled edge sections descending from the edge to the bottom section,
        wherein the bottom section has a substantially square shape,
        wherein the plurality of receptacles are provided in a discrete arrangement at edges of the bottom section on an upper surface of the frame within the depression,
        wherein the plurality of visual markings are arranged in an asymmetric pattern on the upper surface of the frame within the depression, and
        wherein the frame further comprises a plurality of slit openings on each of the angled edge sections; and
    an aerial vehicle comprising a housing, a plurality of propellers disposed within the housing of the aerial vehicle, at least one propulsion motor coupled to the plurality of propellers, a plurality of landing extensions extending below the housing of the aerial vehicle, and a first camera having a first field of view extending along or parallel to a yaw axis below the housing of the aerial vehicle,
        wherein the housing of the aerial vehicle has a size and a shape corresponding to the upper rim of the housing of the docking station,
        wherein the plurality of landing extensions are provided in a discrete arrangement below the housing of the aerial vehicle corresponding to the discrete arrangement of the plurality of receptacles, and
        wherein each of the plurality of landing extensions has an end having a diameter not greater than diameters of each of the plurality of receptacles, and
    wherein the aerial vehicle is docked with the docking station when each of the ends of each of the plurality of landing extensions is inserted into one of the plurality of receptacles and when the housing of the aerial vehicle rests on the frame of the docking station.

2. The system of claim 1, wherein the housing of the docking station further comprises a vertical extension above a portion of one of the walls,
    wherein the aerial vehicle further comprises a second camera, and
    wherein the vertical extension obscures a second field of view of the second camera when the aerial vehicle is docked with the docking station.

3. The system of claim 1, wherein each of the housing of the docking station, the frame of the docking station and the housing of the aerial vehicle has a substantially square shape with rounded corners, a length between twenty-five and thirty centimeters, a width between twenty-five and thirty centimeters, and a height between five and ten centimeters.

4. The system of claim 1, wherein each of the angled edge sections of the frame descends at a first angle with respect to the bottom section,
    wherein the bottom section comprises a central portion raised with respect to a perimeter of the bottom section, and
    wherein a distance between ends of the landing extensions and an underside of the housing of the aerial vehicle is approximately equal to a distance between the plurality of receptacles and the central portion of the bottom section.

5. The system of claim 4, wherein the central portion of the bottom section comprises a first contact for transferring or receiving one of data or electrical power,
    wherein the underside of the housing of the aerial vehicle further comprises a second contact for transferring or receiving the one of data or electrical power, and wherein the docking station is configured to transfer or receive the one of data or electrical power by way of the first contact and the second contact when the aerial vehicle is docked with the docking station.

6. The system of claim 1, wherein at least the upper surface of the frame is formed from a low-friction plastic, and
wherein the low-friction plastic comprises one or more of:
a nylon;
a polyethylene;
a polyetheretherketone; or
a polytetrafluoroethylene.

7. The system of claim 1, wherein the diameters of the ends of each of the plurality of landing extensions are greater than widths of each of the plurality of slit openings.

8. The system of claim 1, wherein each of the plurality of visual markings is one of a symbol or a character arranged in the asymmetric pattern on the upper surface of the frame within the depression.

9. A system comprising:
an unmanned aerial vehicle comprising:
a plurality of landing feet extending on a first side of the unmanned aerial vehicle; and
a first charging connector disposed on the first side of the unmanned aerial vehicle; and
a dock comprising:
a first portion comprising:
one or more channels disposed proximate an outer perimeter of the first portion;
a plurality of recesses, wherein each of the recesses is disposed within at least one channel of the one or more channels;
a central portion, wherein the central portion is raised relative to the plurality of channels; and
a second charging connector disposed at the central portion; and
one or more sloped surfaces surrounding the first portion,
wherein each of the plurality of recesses are shaped, positioned, and dimensioned to receive one of the plurality of landing feet.

10. The system of claim 9, wherein each sloped surface of the one or more sloped surfaces comprises a plurality of openings.

11. The system of claim 9, wherein each sloped surface of the one or more sloped surfaces comprises a plurality of slit openings.

12. The system of claim 9, wherein each sloped surface of the one or more sloped surfaces comprises a plurality of slit openings, and
wherein each of the plurality of slit openings has a lengthwise direction aligned in a direction of the slope.

13. The system of claim 9, wherein the one or more sloped surfaces comprises four sloped surfaces.

14. The system of claim 9, wherein the one or more channels form a rectangle.

15. The system of claim 9, wherein the one or more channels surround the central portion.

16. The system of claim 9, wherein the first portion further comprises a plurality of sloped portions about the central portion.

17. The system of claim 9, wherein the one or more sloped surfaces are formed from a low-friction plastic.

18. The system of claim 9, wherein the unmanned aerial vehicle comprises a camera,
wherein the dock comprises a privacy member extending from a portion of the dock, and
wherein the privacy member is positioned to obscure at least a portion of the camera when the unmanned aerial vehicle is received within the dock.

19. The system of claim 9, wherein the dock comprises a plurality of reflectors arranged in an asymmetric pattern.

20. The system of claim 9, wherein the dock comprises a plurality of light sources arranged in an asymmetric pattern.

21. The system of claim 9, wherein the dock comprises a plurality of light emitting diodes arranged in an asymmetric pattern.

* * * * *